(12) United States Patent
Howard et al.

(10) Patent No.: US 7,646,973 B2
(45) Date of Patent: Jan. 12, 2010

(54) COMBINATION FLASHLIGHT AND CAMERA SYSTEM

(75) Inventors: Michael Howard, Fargo, ND (US); Wade Steinbring, Fargo, ND (US); Keith Nelson, Badger, MN (US); Jon W Blanks, San Antonio, TX (US)

(73) Assignee: Lynk3 Technologies, Inc, Moorhead, MN (US)

( * ) Notice: Subject to any disclaimer, the term of this patent is extended or adjusted under 35 U.S.C. 154(b) by 271 days.

(21) Appl. No.: 11/262,696

(22) Filed: Oct. 31, 2005

(65) Prior Publication Data

US 2007/0098391 A1 May 3, 2007

(51) Int. Cl.
*G03B 15/03* (2006.01)
*F21L 4/02* (2006.01)

(52) U.S. Cl. .................... 396/155; 396/429; 362/184

(58) Field of Classification Search .............. 396/155, 396/429, 535; 362/184, 234; 356/402, 404
See application file for complete search history.

(56) References Cited

U.S. PATENT DOCUMENTS

| 5,931,562 | A | * | 8/1999 | Arato .................... 362/184 |
| 6,095,661 | A | | 8/2000 | Lebens |
| 6,642,955 | B1 | * | 11/2003 | Midgley et al. ............ 348/164 |
| 6,692,432 | B1 | | 2/2004 | Yarush |
| 6,749,316 | B1 | * | 6/2004 | Wong et al. ................ 396/429 |
| 6,791,283 | B2 | * | 9/2004 | Bowman et al. ........... 315/291 |
| 6,877,878 | B2 | * | 4/2005 | Raskas ...................... 362/253 |
| 2006/0171700 | A1 | * | 8/2006 | Yang et al. ................. 396/155 |

* cited by examiner

*Primary Examiner*—Patrick J Assouad
*Assistant Examiner*—Autumn Parker
(74) *Attorney, Agent, or Firm*—Michael S. Neustel

(57) ABSTRACT

An improved method and apparatus for hand-held portable illumination, sensing and evidence collection is described. A uniquely configured multi-functional device selectively provides multi-purpose lighting and sensing in a hand-held portable device which is usable as a flashlight, camera and as an integrated device for evidence collection.

1 Claim, 21 Drawing Sheets

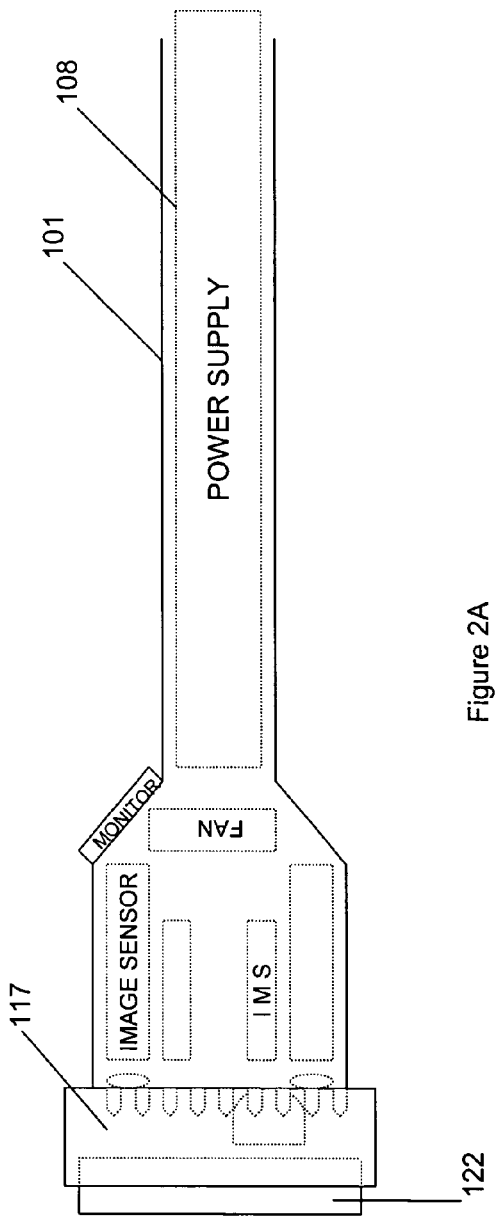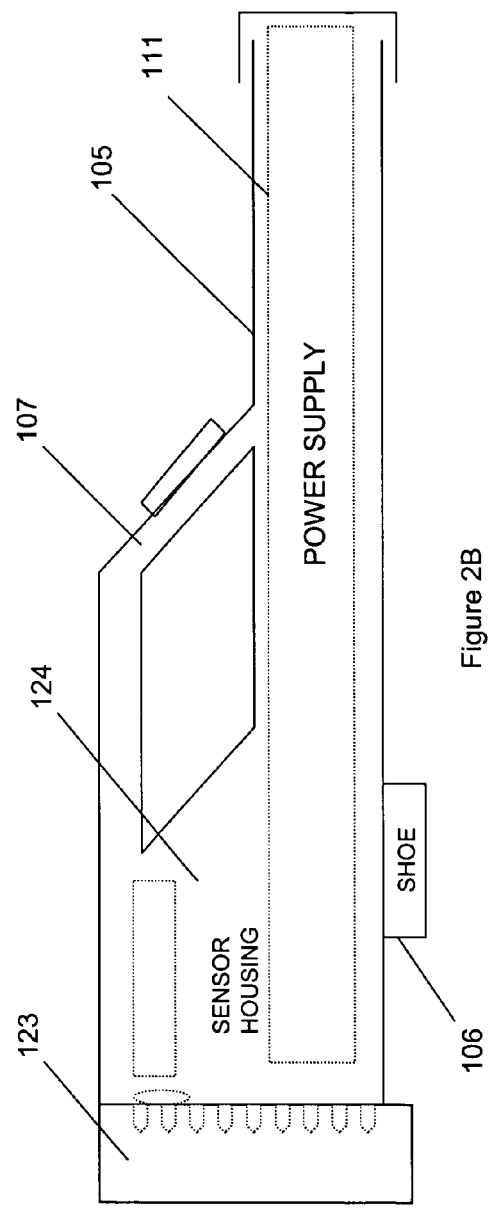

COMBINATION FLASHLIGHT AND CAMERA SYSTEM

FIELD OF THE INVENTION

This invention relates to the fields of detection and collection of evidence, and more specifically to a method and apparatus for viewing an object or scene regardless of ambient lighting conditions and for detecting and collecting data from that object or scene with a single hand-held portable device.

BACKGROUND OF THE INVENTION

There is a widespread need for hand-held flashlights and cameras. In the fields of safety and security, there is also a need for evidence detection and collection.

Law enforcement, safety and security personnel have access to an array of devices which aid them in their work. Such devices include flashlights, still and video cameras, and breathalyzers. Typically, however, due to weight or space constraints, an officer or security guard must choose the tools he or she will carry on his or her person and leave other tools behind at the station or in a vehicle. Understandably, an officer's need for safety weighs heavily on the choice of what to carry. When entering a dark alley, an officer will likely choose to carry a flashlight rather than a camera.

In other words, the number of tools an officer might need in a given day can easily exceed the number of devices the officer can conveniently carry on his or her person. Thus, there is a need for a compact tool kit for safety and security officers. Examples of devices suitable for inclusion in such a kit include flashlights, cameras, chemical and physical sensors, time-date stamping and Global Positioning Systems (GPS).

Flashlights

Recent flashlight technology "takes advantage of the efficiency of high-intensity, light-emitting diodes (LEDs) in the visible spectrum and/or infra-red (IR) or ultra-violet (UV)," and of "the low-voltage properties of CMOS integrated circuits and components" (See, U.S. Pat. No. 6,095,661 issued to Lebens, et.al.) In Lebens, an LED housing is attached to the front end of a flashlight and serves as the illumination source of the flashlight.

Variously colored LEDs can be used for specialized purposes. For example, LEDs producing long-wavelength light, (660 nm or longer), can be used underwater at night without disturbing sea life activity. Short-wavelength blue and UV LEDs can be used with a UV filter to view fluorescing materials, such as security stamps. IR LEDs are used for military or police purposes in night-vision equipment. LEDs of various "viewing" angles have been used to achieve wide-angle, narrow-angle, and long-range viewing. A Fresnel lens (or other lens or reflector arrangement) has been used to provide a focusable light source. And, polarizers have been used to reduce reflections. Modern flashlights utilize quickly and easily pluggable/replaceable LED arrays or heads of various shapes, colors, and/or viewing angles for different applications. Also, as noted in Lebens, LED intensity can be controlled by changing the pulse width.

Imaging

Today most portable camcorders are typically used in a raised position, with the camera held in front of the user's eye both for stability and for picture composition. That is, the viewer typically likes to have the camera view the scene at the same angle the user is viewing the scene. In fact, the typical camcorder user has a much greater interest in the aesthetics of the recording than in using the recording as a collection of data which can later be used as evidence.

When working at a scene which has been secured, law enforcement and security personnel use video and still cameras in the same manner as the amateur or professional photographer, holding the camera up and looking at a scene through a lens or viewing the scene on a display. However, when in hot pursuit, to look through a lens or to view a monitor, is a distraction that places the officer at risk of being harmed.

When using a camcorder, law enforcement and security personnel have an interest not only in obtaining images at a secure scene but also in capturing sequences of events as they occur. Law enforcement and security personnel have a need to record events without prior planning. When faced with the need to capture events as they occur, the exact picture composition becomes less important.

For example, in a chase, it is desirable to record a fleeing suspect or vehicle. At the same time, law enforcement and security personnel must be attentive to the safety of themselves and others who might be present. A clear understanding of the events of a chase may be obtainable only on a retrospective review of the chase. The accuracy of that review is improved if a recording of the chase is available. Some events that were missed by an officer in hot pursuit may be picked up on a recording. Therefore, law enforcement and security personnel have a need for a camera that can be used without distracting them from the task at hand.

Light-Imaging Combinations

Lighting has been developed for use with still and video cameras to assure that an adequate amount of light is available to allow an image to be captured. That is, historically, the light source supports the still or movie recording function of a still or movie camera.

The lighting may be mounted on or inside a still or video camera.

In one embodiment of Lebens, an LED housing is attached to a conventional camcorder to serve as a lighting source for the camcorder. That is, the light source is added to the camera. The LED housing and the camcorder do not share the same optical axis. This is illustrated in FIG. 5 of Lebens. And, furthermore, the LED housing as illustrated in FIG. 5 of Lebens does not function independently as a flashlight.

When using artificial lighting in conjunction with a still picture camera or moving picture recorder, the user is concerned only with the lighting conditions at the time a picture is being taken or a movie is being recorded. Typically, when an artificial lighting device is integrated with a still picture camera or a moving picture recorder, the lighting device only functions when a picture is being taken or a movie is being recorded. That is, the illumination is on only when the camera is running. And, the synchronization of a flash to the opening of a shutter or of the pulsation of lighting to the frame rate of a recorder is often desirable.

For example, in U.S. Pat. No. 6,095,661 issued to Lebens, et.al., the inventors note, in column 7, line 62 to column 8, line 7:

> In one such embodiment, flashlight 100 is used in conjunction with a portable video camcorder or other video camera, and feedback 160 measures the overall ambient light and provides a signal that allows generation of flashlight pulses to compensate for lack of light, in order to provide optimal lighting for the video camera. In one such embodiment, the pulses to the LEDs are synchronized to the video camera frame rate using optional pulse synchronization (sync) signal 170 in order that the light pulse from LEDs 150 is only on when the video camera shutter is collecting light (avoiding light output when the camera will not benefit from it). (Emphasis Added)

Notably, although Lebens, presents various examples of using an LED flashlight, Lebens never inserts a video recording device inside a flashlight housing. For example, Lebens writes:

In one such embodiment, long-wavelength LEDs, 660 nm or longer, are used to provide underwater divers or aquarium enthusiasts a light source for observing undersea life at night without adversely affecting the nocturnal activities of such wildlife. This functionality is also useful for tropical aquarium owners who also wish to observe the nocturnal activities of the occupants of their aquariums. (Emphasis Added)

A distinct advantage of the present invention, is that an enthusiast can not only observe the activity of a desired subject, but can also record that subject with the same convenience and ease as holding and operating a conventional flashlight with a single hand.

U.S. Pat. No. 6,692,432 issued to Yarush, et al is an example of a camera developed for a special function. Yarush, et. al. discloses an endoscope in which a lens is optically coupled to an imaging system and the light source transmits light through the lens. As noted in Yarush, "The practitioner then views the illuminated object on the video monitor." In Yarush, a video capability is added to an endoscope and the camera utilizes the light source of the endoscope.

In the invention disclosed herein, various data collection sensors are integrated with a flashlight thereby improving the process of evidence collection.

Unfulfilled Needs

Need for Multi-Functional Devices

In the course of a safety and security officer's routine work, there are occasions when recording an image of a scene or object is desirable. On the other hand, there are times when an area must also be secured to prevent tampering with a scene until photographic or other evidence can be obtained. And, in certain circumstances, for example when an officer is in hot pursuit or in the presence of an extreme hazard, such as a fire, the officer might have to leave an area of interest. In such circumstances, unless the officer happens to be carrying a camera, the opportunity to collect important evidence is lost. However, due to the added weight of carrying a camera, the tendency is to leave the camera behind, in another location, such as an office or vehicle, and to fetch the camera only when it is later unexpectedly found to be needed.

Missed opportunities to collect evidence are not limited to the collection of photographic evidence. Ion mobility spectrometry analyzes a sample of air collected at a given moment in time. The presence of wind or even a mild breeze may result in a significant change in results over time, especially if the time lapse is prolonged. However, once again, the need for having several devices at one's disposal at all times is weighed against the inconvenience of carrying additional devices.

Accordingly, a multifunction device is desirable, especially if the incorporation of additional functions into the device can be achieved without the addition of a significant amount of weight. In particular, it is desirable to incorporate an image capturing function into the multi-functional device, especially if there is little or no increase in the weight carried.

Multi-Functional Flashlights

Many law enforcement and security personnel already carry and use a flashlight in their routine work. Accordingly, a flashlight style body would be suitable as a vehicle for the incorporation of additional functions. In addition to the fact that law enforcement and security personnel already use flashlights in their work, there are other advantages in choosing a flashlight as a multifunctional device. For example, the lighting of the device can serve the dual purpose of flashlight illumination and lighting support for a still and/or movie camera. Also, a single set of batteries can be used to power both the flashlight and the camera.

As noted previously, the lighting provided on a camera was designed to provide light to support the capturing of an image not to provide a light source for general purposes such as the light of a flashlight. Since a flashlight user continues to view the field directly rather than through a lens or by looking at a monitor, using a multifunction flashlight does not distract the user from his or her main purpose of surveying the field. An indicator light or a laser pointer can be placed in the flashlight to indicate the camera is on. And, the flashlight beam or a laser pointer indicates the general area being recorded.

Evidence Collection

Law enforcement and security personnel function in an increasingly technical environment and must remain current not only in collecting evidence, but also, in preparing and presenting that evidence for outside scrutiny. Hard evidence, evidence that is irrefutable and not subject to interpretation, is difficult to obtain. Often, the facts presented by one person are disputed by another. At other times, the maintenance of the chain of custody of evidence is questioned or tampering with the evidence is alleged.

Currently, an officer might come upon a crime scene and then call for a team of experts to examine the scene and to collect evidence. Or, one officer might remain at a crime scene while his partner goes back to the patrol car to get a camera. Consider the case when an officer in hot pursuit claims to have seen the alleged perpetrator toss a gun into the woods or a garbage can only to be unable to find that gun when he returns to search the area. Any time lapse that cannot be accounted for allows speculation as to what happened or might have happened during that time lapse. Who else had access to the scene? Who might have taken something from or added something to the crime scene?

With the prevalence of camcorders today, it is not uncommon, especially in a tourist area or during the staging of an event, for a passerby to have recorded an incident, and thereby to have added evidence to support or refute an interpretation of the events as they occurred.

In addition to visual evidence, law enforcement and security personnel often collect other physical or chemical evidence. Thus, depending on the situation, an officer might use a breathalyzer to collect an alcohol level, an ion detector to sense the presence of carbon monoxide or chlorine gas, or a Geiger counter to detect the presence of radiation.

Products developed to gather evidence at a crime scene also have application in collecting data for other purposes. A Geiger counter is useful both in the detection of a dirty bomb and in the detection of a leak from a nuclear facility. Ion detectors are useful in analyzing intentional chemical and biological warfare attacks as well as household gas leaks, chlorine gas contamination after an accident, and odors emitted by bacteria. A metal detector might indicate the presence of coins in a pocket, a knife strapped to one's leg or a gun in a holster.

The recording of the exact time, date and location of any event might prove useful. And, the simultaneous gathering of chemical or physical data along with visual data may provide the confirmatory evidence needed to understand exactly what is happening at the time and place being recorded. For example, a high alcohol level recorded simultaneously with a video of a driver staggering out of his car a few seconds after that car was recorded weaving through traffic lays to rest a driver's contention that he was parked at the road intending to sleep until he was sober. Furthermore, if all evidence is collected by a single device with a common date, time, and location stamp, the quality of evidence is improved. For example, when evidence is collected by different devices, using different clocks or watches, any discrepancy in time must be explained. Were the clocks not synchronized? Or, did someone tamper with the timing of one of the devices? In the present invention one could employ a radio link or other coupling to a recognized broadcast time standard for purposes of synchronizing and authenticating time-stamp indicia associated with all functions of the device unit.

OBJECTS OF THE INVENTION

It is, therefore, an object of the present invention to provide a portable device for safety and security officers, wherein the device provides a flashlight function and at least one sensing function.

In particular, it is an object of the present invention to add a sensing function to a lighting device wherein the lighting device is as similar as possible, in size, shape and weight, to a flashlight.

It is also an object of the present invention to provide a person with a device that is as similar as possible in size, shape and weight to a flashlight device which would be conventionally employed in that person's normal activities.

Another object of the present invention is to provide a portable, hand-held device that comprises a flashlight and an image sensor.

A further object of the present invention is to enable the collection of high quality evidence and to enable the simultaneous collection of related, corroborating evidence by a single device.

In particular, it is an object of the present invention to lessen disputes regarding the accuracy of related evidentiary data that is collected and identified by the invention.

It is a further object of the present invention to provide a hand-held portable device having a variety of detection and collection capabilities, including selectable light wavelengths and light sources, still picture and video imaging, chemical and physical data collection, time-date-location stamping.

It is yet another object of the present invention to provide a cooperative linkage, between sensed data and a time stamp, in a portable device which also provides illumination.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

These and other objects and features of the present invention will become more fully apparent from the following description and appended claims, or may be learned by the practice of the invention as set forth hereinafter.

SUMMARY OF THE INVENTION

The present invention provides a method and apparatus for hand-held portable illumination, sensing and data collection. The illumination, sensing and data collection components of the invention are conveniently and uniquely packaged in a flashlight housing.

The invention comprises a flashlight housing suitable for housing a power source, at least one illumination source, and at least one sensor.

Flashlight Housing

A particular advantage of using a flashlight housing to package the components of a sensing device is that many workers, for example law enforcement, safety and security personnel, often carry and use flashlights to aid them in the performance of their routine duties. Such workers already have made provision, for example on their belts or in their pockets, to carry a flashlight.

The exact shape of the flashlight housing is determined by the user and by the items selected to be mounted within various sections of the flashlight housing.

Power Source

The power source provides power for the sources of illumination, for the sensors of the apparatus, and for the monitor or display of the apparatus.

Typically the power source comprises at least one battery. Preferably, the batteries are rechargeable. Depending on the specific structure and design of the flashlight housing, rechargeable batteries may or may not need to be removed from the flashlight housing to be recharged. Preferably, the battery charging function is integrated into the docking station. For example, when the power source is held in place by a conventional spring, the flashlight housing can be placed in a docking station to allow direct contact of a power source to its charger. Alternatively, when the flashlight housing is equipped with a docking shoe, the batteries are recharged when the shoe makes contact with its corresponding docking station.

Illumination

Preferably, any illumination source comprises one or more LEDs. However, conventional bulbs may also be used. An embodiment may comprise more than one light source, with each light source providing a different spectral range of illumination. Every LED of an illumination source may function at the same wavelength or an illumination source may comprise LEDs of two or more wavelengths. For example, depending on the wiring of a switch, a flashlight with three LEDs (red, green and blue) or three groups of LEDs (red, green and blue), may have six different illumination sources (red, green, blue, red-green-blue, red-green, red-blue, and blue-green). Furthermore, LEDs may be selected not only from the visible light range, but also from other light ranges, such as, for example, from the UV light range or from the IR light range. Some LEDs are capable of emitting light from a range of wavelengths rather than a fixed wavelength. Thus, the range or ranges of light emitted by the device is determined by a user's selection of LEDs placed in the device as well as by the wiring of the switches of the device.

Filters

Filters provide an alternative way of varying the spectrum of the light emitted by the device. One or more filters may be used in conjunction with one or more light sources to permit a selection of light range illumination. For example, a source of illumination that emits a broad range of wavelengths may be used without filtering to emit visible light, with a UV pass filter to emit ultraviolet light, and with an IR pass filter to emit infrared light. More than one filter can be used together. For example, a source of illumination that emits a broad range of wavelengths may be used with an IR pass filter which allows the passage of all infrared light and an IR cut filter which eliminates the passage of a range of infrared light to select a particular range or ranges of infrared light illumination.

Furthermore, a filter can be inserted in front of or behind a lens to vary the light received by an image sensor.

Sensors

The preferred embodiments of the present invention include at least one sensor. In an embodiment comprising more than one sensor, the user selects the sensor to use depending on the application.

The sensors serve to collect evidentiary data. A variety of image, physical and chemical sensors are suitable for use in the invention. Image sensors enable the capture of still or video images. Physical sensors suitable for use in the invention include heat sensors, metal detectors, motion sensors and Geiger counters, chemical sensors suitable for use in the invention include ion mobility sensors, breathalyzers and gas detectors. Some chemical sensors are capable of detecting only one chemical, such as, for example, ethyl alcohol or carbon monoxide, and other chemical sensors are capable of detecting several types of chemicals or chemical groups, such as, for example alcohols or gases.

A user may opt for ease of use or specialized use depending on the configuration of the apparatus. For example, a user may select an image sensor that provides good color still pictures in daylight or a sensor that provides sharp black and white movie recordings with infrared lighting, or a sensor that permits recording both still and video images under all lighting conditions.

In an embodiment which includes at least one chemical sensor, such as, for example, an ion mobilization spectrometer, the user selects the sensor or sensors appropriate to the situation. For example, in a case of suspected intoxication, an arresting officer might use an alcohol sensor, a narcotic sensor or both to gather evidence. In a similar situation, an emergency department physician faced with a poorly responsive patient might use both alcohol and narcotic sensors to help distinguish acute intoxication from a stroke. And, in another scenario, an EMS squad responding to a call of an unresponsive patient may use a carbon monoxide sensor to determine gas levels at the scene.

Software

The user can select a variety of software for use with the device.

For example, a device comprising an image sensor can be integrated with a device comprising facial recognition software to record and store biometric data and to analyze and compare the biometrics of a person being imaged or photographed with data previously obtained.

Stamping

The apparatus provides real time recording of data that can be date, time and location stamped.

For purposes of evidence collection, the data collected will be at least time-date stamped (temporal stamping). Optionally, the data collected will be time-date and location stamped. Location stamping can be done manually, with the location being keyed in by the user. Alternatively, the location can be determined and stamped by a GPS system which is integrated into the evidence collection device.

Connectivity

The device of the present invention may also include a wireless Internet connection, local or wide area network connection, or cellular phone connection. Other options include docking station capability and various internal or external memory devices, such as, for example, IDE, USB, Firewire or other standard devices.

Summary

In response to a tremendous need in the art, the present invention provides a method and apparatus for hand-held portable illumination, sensing and data collection. The apparatus also provides real time recording of data that can be date, time and location stamped.

The invention is versatile. The user can select from among several components to be included in his/her particular package or tool kit. Furthermore, once the selected components are assembled into a kit, the user may choose which component or components to use for a given task. That is, the user may use only one component at a time or may use two or more components simultaneously.

The invention also allows various image output and transmission capabilities and can be integrated with internal and external memory devices and software, including facial feature and analysis software to provide recognition and identification in real time.

As will become obvious in the examples that follow, the invention increases the number of tools a user can carry, enables the user to use two or more tools simultaneously or to easily switch from one tool to another, and permits the user to simultaneously collect related data.

Furthermore, as will become obvious in the examples that follow, there are important evidentiary advantages to the simultaneous collection of related data by tools packaged in a single device.

BRIEF DESCRIPTION OF THE DRAWINGS

FIG. 2A illustrates a schematic of another embodiment of the present invention.

FIG. 2B illustrates a schematic of another embodiment of the present invention.

DETAILED DESCRIPTION OF THE INVENTION

Figure 1A:
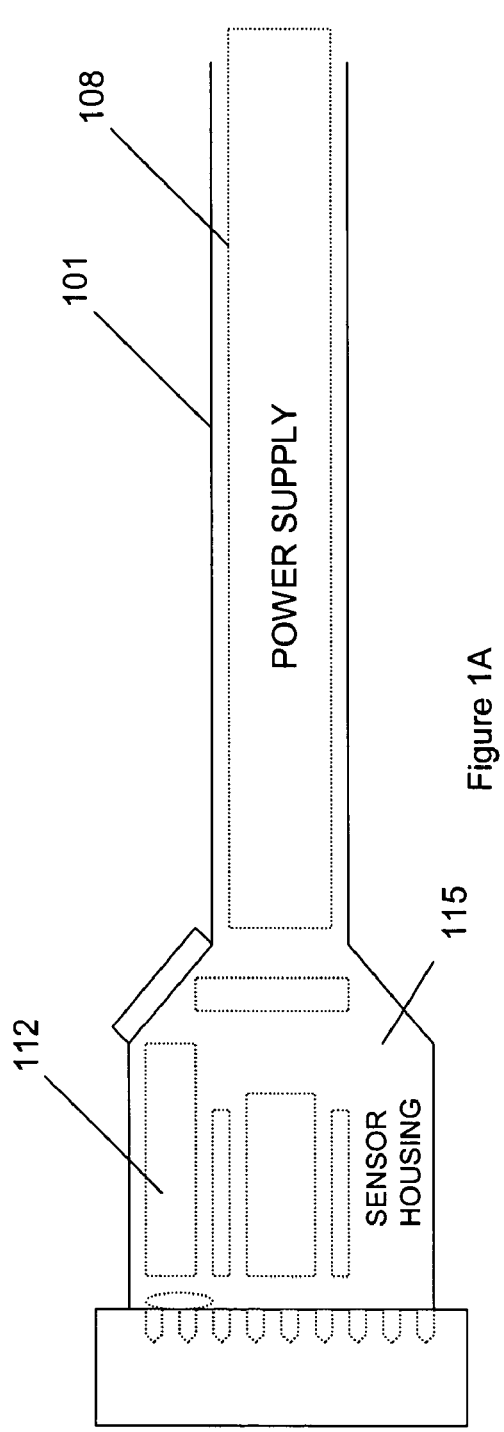
FIG. 1A illustrates a schematic of one embodiment of the present invention.

A detailed description of the invention is now presented with reference made to the accompanying drawings which illustrate specific embodiments of the invention. It is understood that other embodiments may be utilized and structural changes may be made without departing from the scope of the present invention.

Definition of Terms

Please note, that for ease of description, in this application, when a lamp, bulb, light source or light housing is attached to one end of the device, as is the case, for example in a typical flashlight, the attachment of that lamp, bulb, light source or light housing, is referred to as being within the housing or flashlight housing of the device of the present invention.

First Preferred Embodiment

In a preferred embodiment, the device of the invention comprises a first illumination source, a second illumination source, a lens, an image sensor, a switch, a filter, a housing, and a monitor.

The first illumination source is a source of visible light illumination and the second illumination source is a source of infrared light illumination. Optionally, the candlepower of the visible light source can be varied. And, preferably, the candlepower of the first light source can be varied from 0 (off) to a maximum of at least 85,000 candlepower. Optionally, the range of infrared light illumination of the second light source is selected from 850 to 900 nanometers. And, preferably, the range of infrared light selected is further limited to include 880 nanometers.

The lens and the image sensor are positioned to permit light passing through the lens to project onto the image sensor. The image sensor has a first mode suitable for producing color images from visible light and a second mode suitable for producing black and white images from infrared light.

The switch enables the selection of the first mode. And, the switch enables the selection of the second mode.

In this case, the filter is an infrared pass filter. And, the selection of the second mode positions the filter such that only light passing through the filter projects onto the image sensor. Optionally, the filter is positioned either in front of or behind the lens. Optionally, the infrared pass filter limits the passage of light to a range selected from 850 to 900 nanometers. And, preferably, the range of light is further limited to include 880 nanometers.

There are at least two ways in which the switch can be used to change the mode of the image sensor. The switch may directly change the mode of the image sensor, for example by an electrical or electronic circuit.

Alternatively, the switch indirectly changes the mode of the image sensor by positioning the filter in or out of the path of light striking the image sensor. For example, a dual mode image sensor may function in one mode when it is struck by visible light and in the other mode when it is struck by infrared light. That is, the image sensor is optically controlled by the spectral range of light striking the sensor.

Preferably, the image sensor is an Omni Vision OV3620 Camerachip® with dual color and black and white chipset capabilities. Preferably the image sensor is sensitive to a minimum illumination of less than 0.01 lux.

The housing resembles a flashlight housing. The monitor is mounted on the housing and is operable to display images from signals produced by said image sensor.

Second Preferred Embodiment

In another preferred embodiment, a device of the invention comprises a first illumination source, a second illumination source, a lens, an image sensor, a filter, a switch, a housing, and a monitor.

The first illumination source is a source of visible light illumination. Preferably, the intensity of the first illumination source can be varied from 0 (off) to 85,000 candlepower. The second illumination source is a source of infrared light illumination selected in the range of from 850 to 900 nanometers. And preferably, the range of infrared light selected is further limited to include 880 nanometers.

The lens and the image sensor are positioned to permit light passing through the lens to project onto the image sensor, the image sensor being capable of translating visible and infrared light into an electronic signal, the filter is an infrared pass filter permitting the passage of light in the range of from 850 to 900 nanometers. The switch positions the filter such that only light passing through the filter projects onto the image sensor. The housing resembles a flashlight housing, And the monitor is mounted on the housing.

The first illumination source, the second illumination source, the lens, the image sensor, the filter, the switch, and the housing are assembled to resemble a flashlight.

Third Preferred Embodiment

The device includes a housing, a source of illumination and an image sensor. The housing is substantially shaped like a flashlight. The source of illumination is disposed within the housing. And, the image sensor is responsive to at last one spectral component of the source of illumination.

Other Preferred Embodiments

In another preferred embodiment, the device includes a housing which is substantially shaped like a flashlight; a source of illumination disposed within the housing; an image sensor disposed within the housing where the image sensor is responsive to at least one spectral component of the source of illumination.

Figure 1B:
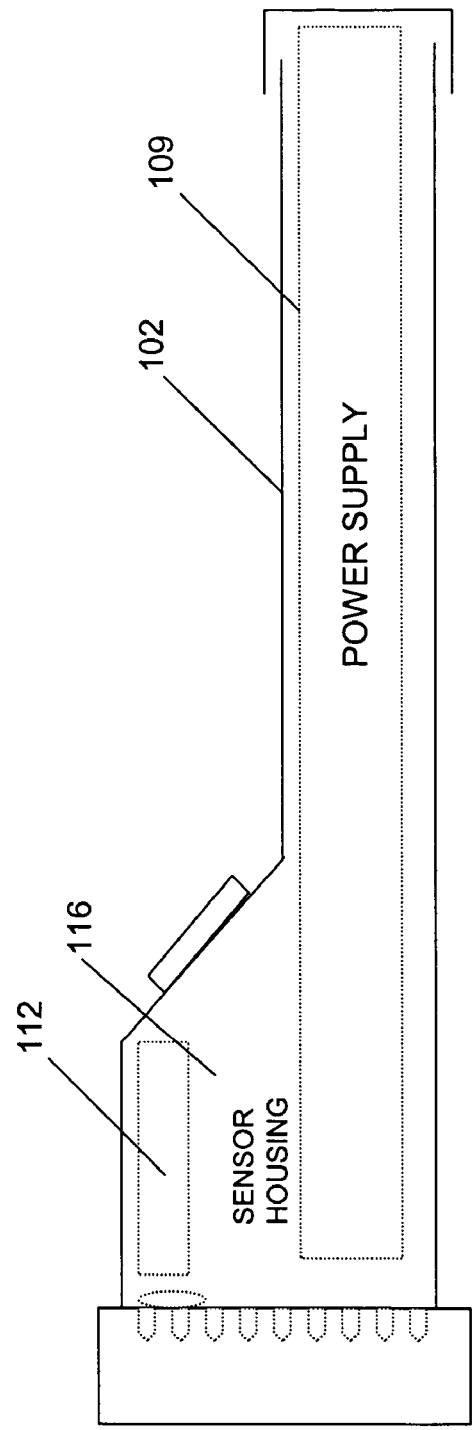
FIG. 1B illustrates a schematic of a variation of a flashlight housing of an embodiment of the present invention.
Figure 1C:
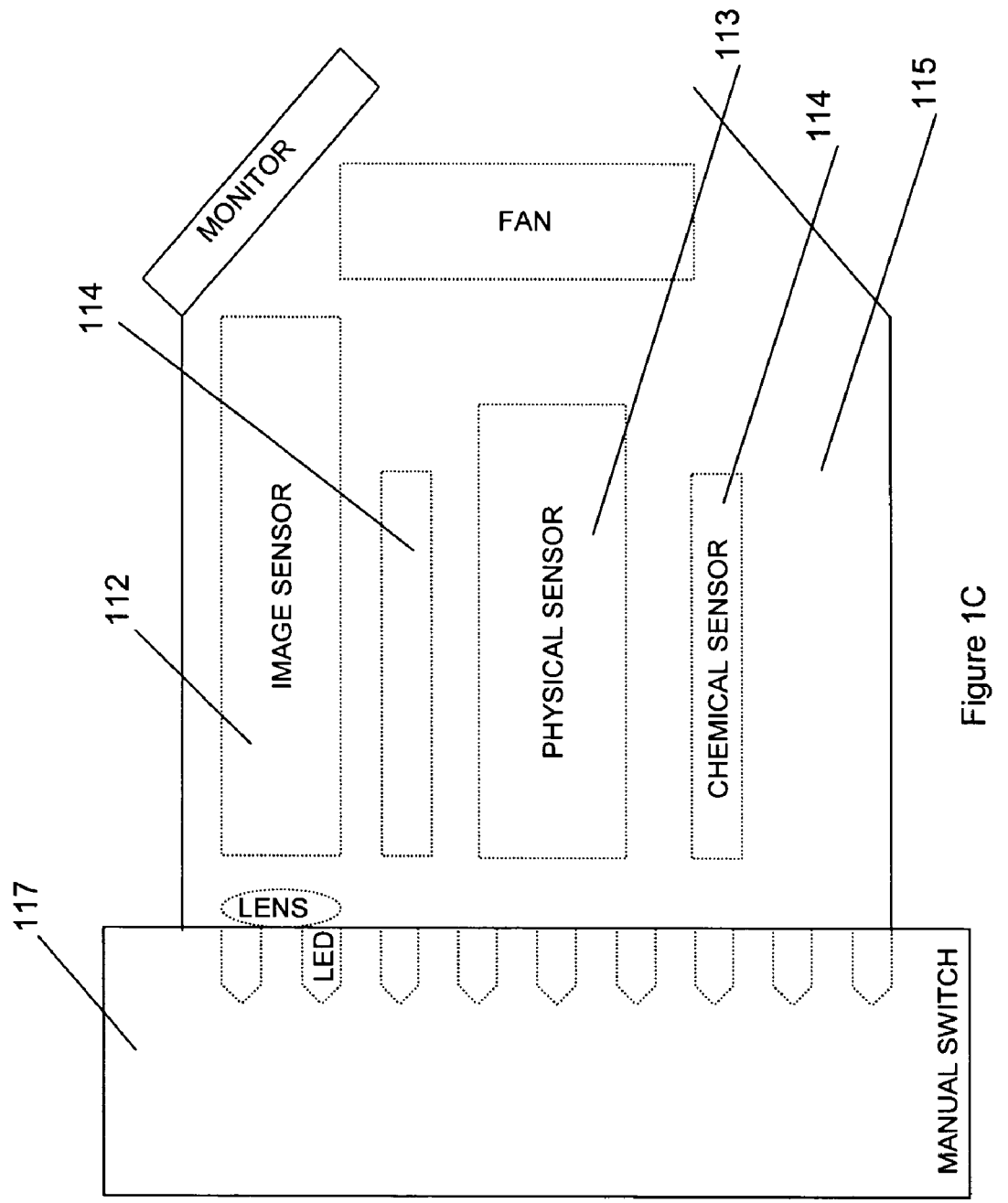
FIG. 1C is a side view schematic of the front end and sensor housing of the embodiment depicted in FIG. 1A.
Figure 1D:
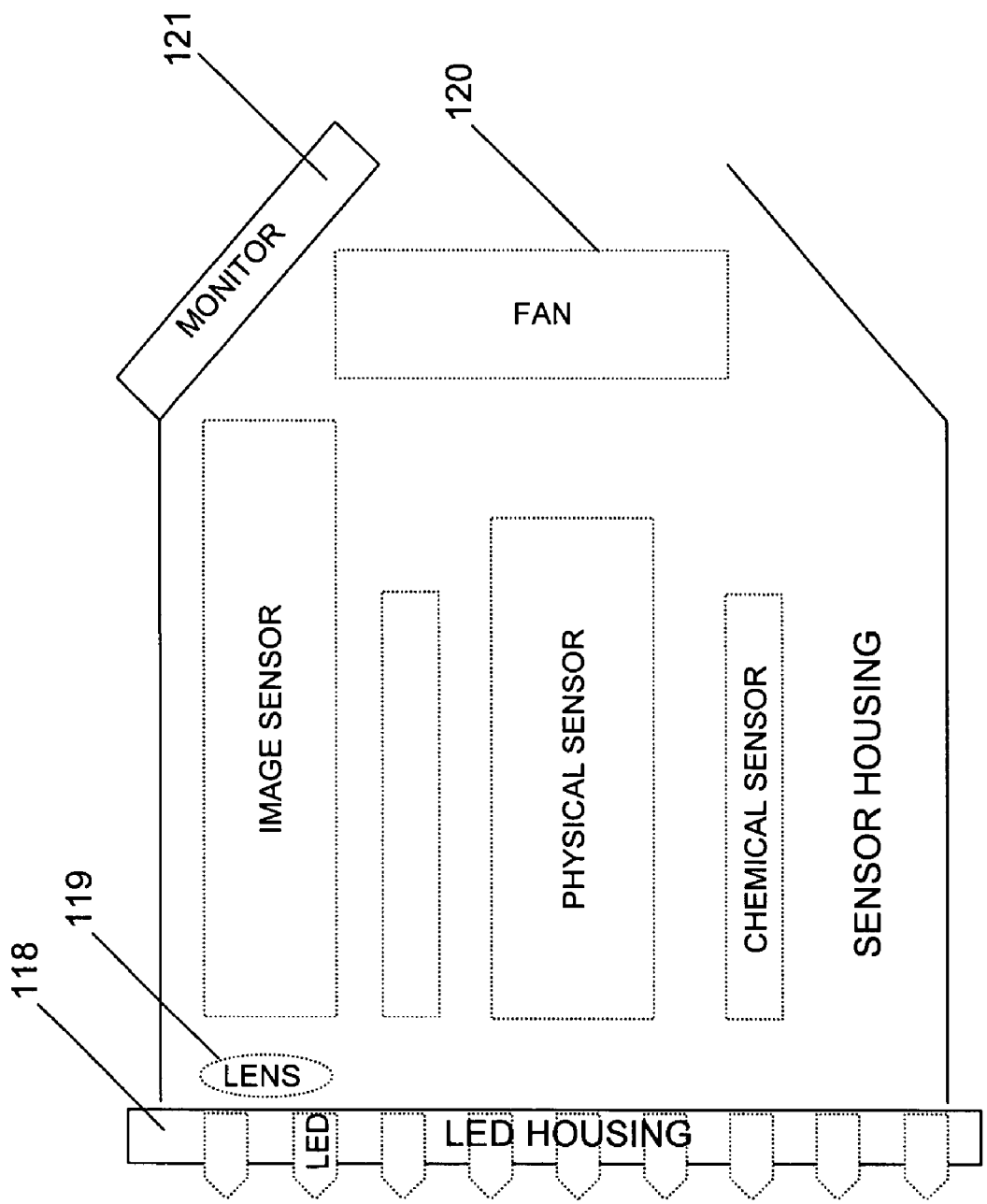
FIG. 1D is a side view schematic of the front end and sensor housing of the embodiment depicted in FIG. 1C after the removal of the manual switch.
Figure 1E:
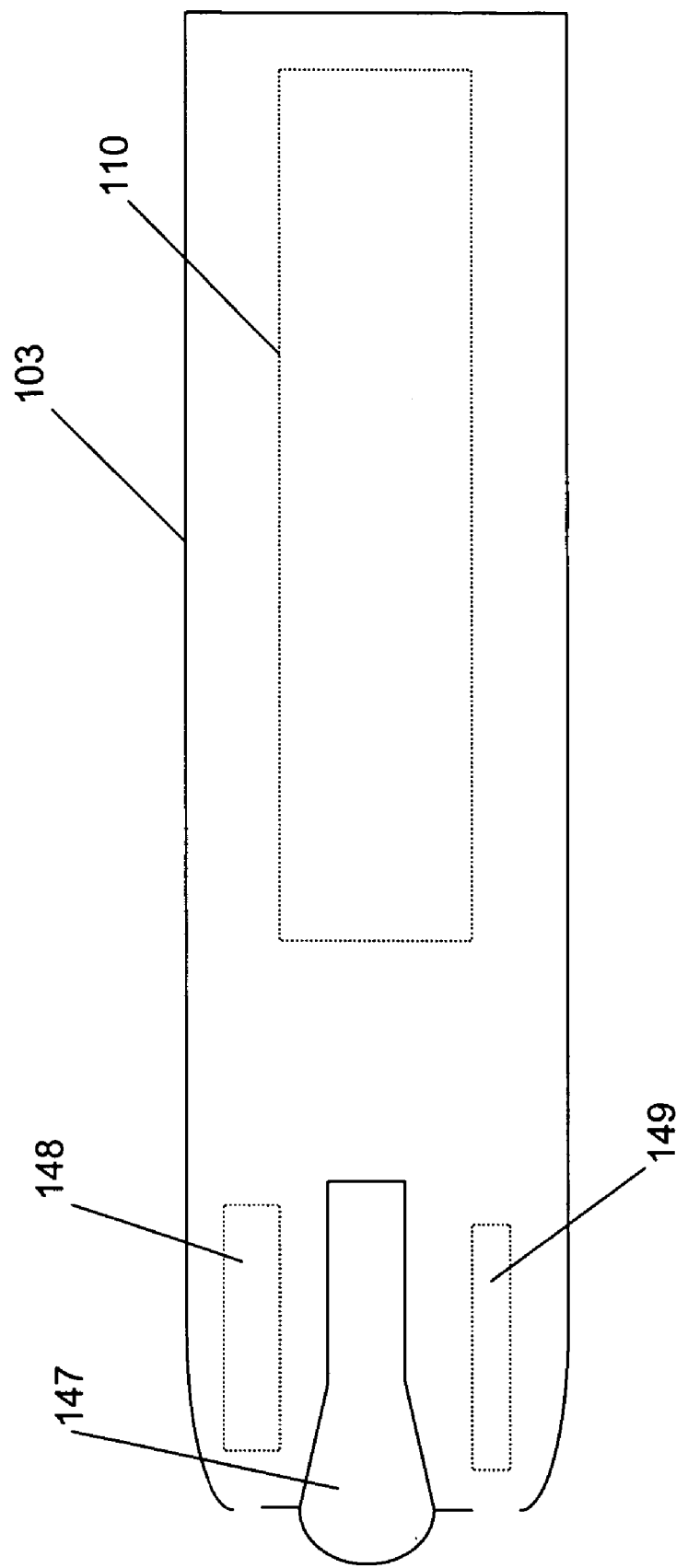
FIG. 1E illustrates a schematic of penlight style embodiment of the invention.

FIGS. 1A, 1B and 1E illustrate different shapes of flashlight housings. In FIG. 1A, flashlight housing 101 is suitable for carrying on a belt. In FIG. 1B, flashlight housing is shaped to allow one to set the flashlight down so that both of the user's hands are free to work. In FIG. 1E, flashlight 103 is shaped like the typical "penlight" which can be carried in a shirt pocket.

Figure 9:
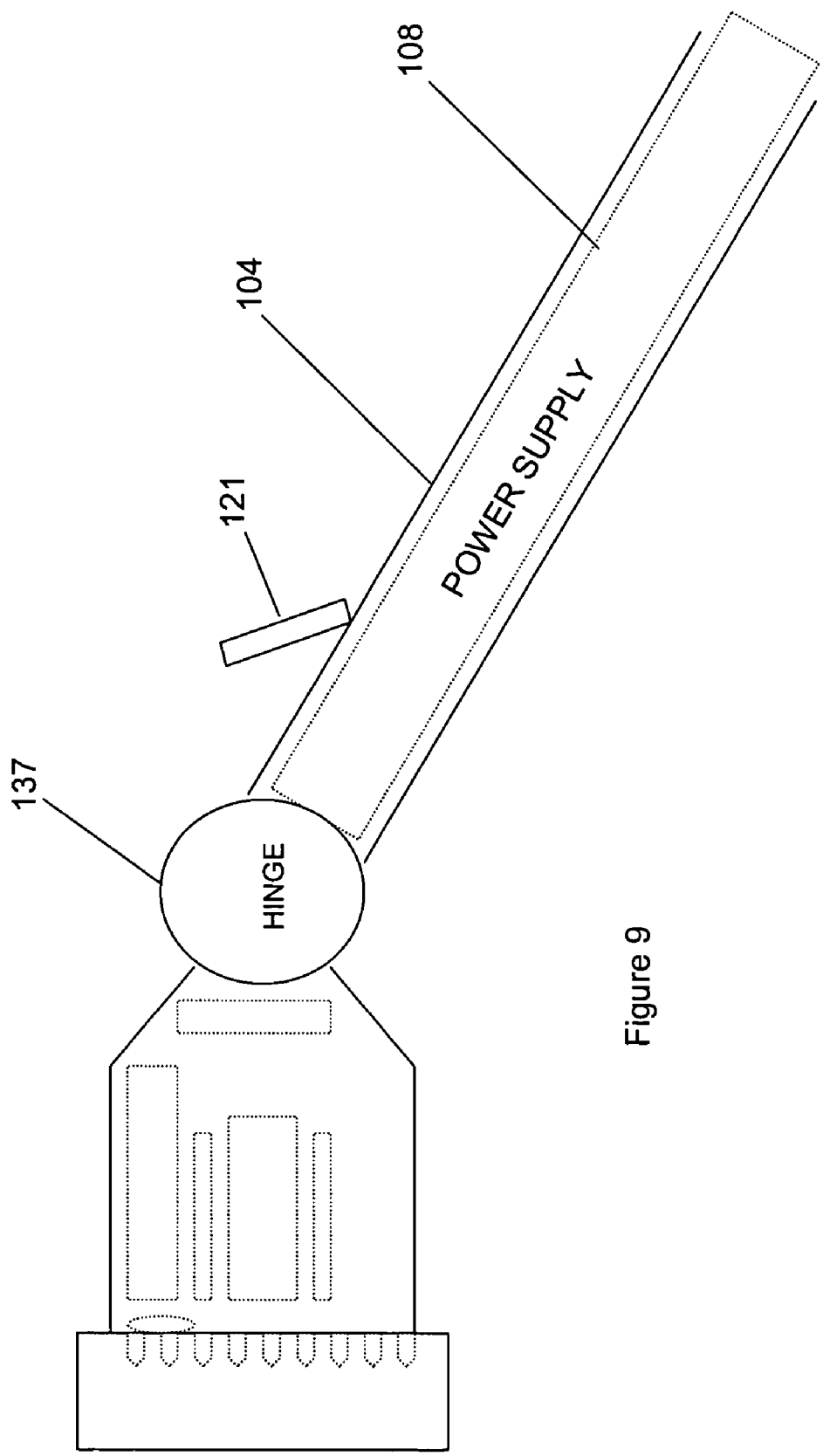
Figure 10:
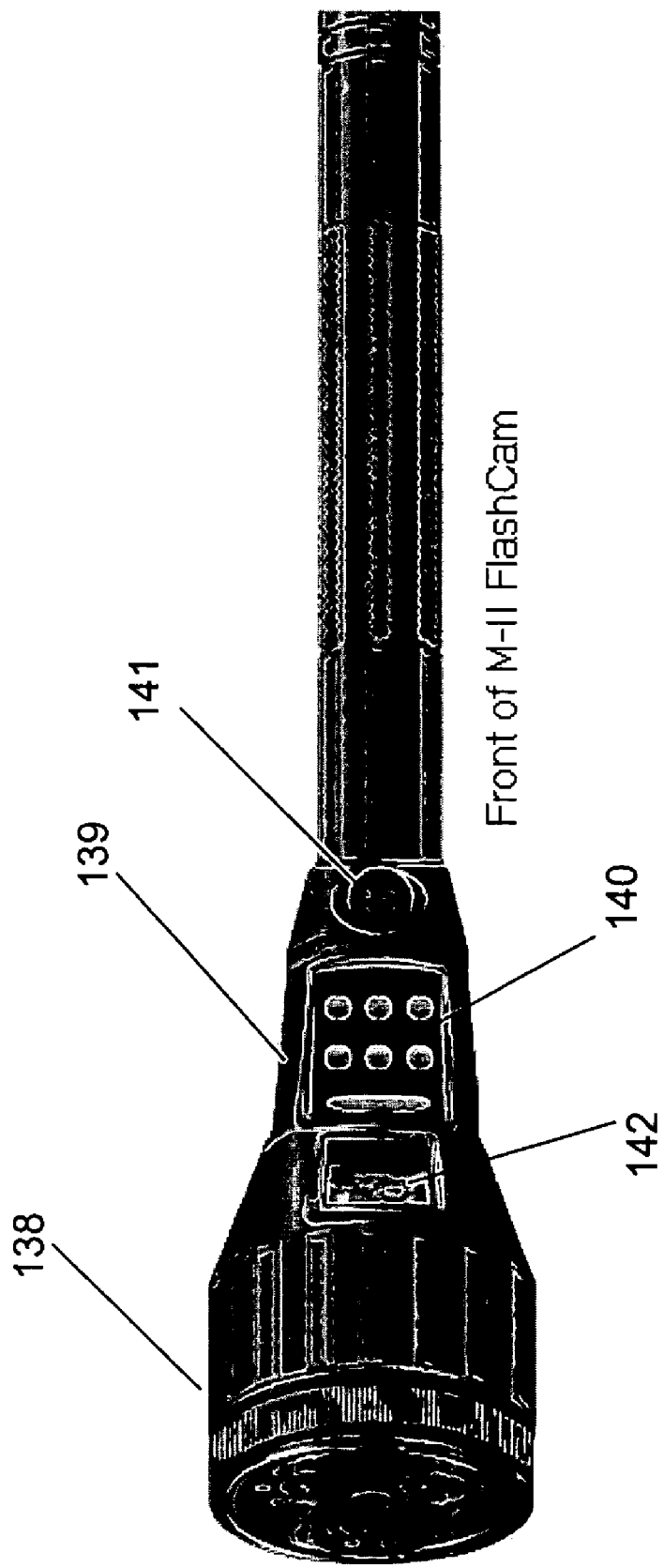
FIG. 10 illustrates a graphic illustration of one side of the flashlight housing of an embodiment of the invention.

In FIGS. 9 and 10, flashlight housing 104 is hinged. And, in FIG. 2B, flashlight housing 105 has a docking shoe 106 and a separate handle 107 which makes it convenient to carry.

Note also that power supplies 108, 109, 110 and 111, which typically are batteries and preferably are rechargeable batteries, are selected to fit the space available in their respective housings.

Referring to FIGS. 1A and 1B, the invention comprises a flashlight housing suitable for housing a power source, at least one sensor and an illumination source. Preferably at least one of the sensors is an image sensor 112. In FIG. 1A, sensors are positioned in the sensor housing section 115 of flashlight housing 101. And, in FIG. 1B, sensors are positioned in the sensor housing section 116 of flashlight housing 102. The schematic in FIG. 1A shows the power source 108 seated in the handle of the flashlight housing. Preferably, the power source is a rechargeable battery or batteries. In FIG. 1A, the power source is held in place by a conventional spring. In this configuration, the flashlight housing can be placed upright in a docking station to recharge the power supply. Alternatively, the power source can be removed from the handle and recharged independently. As illustrated in FIG. 1B, the exact shape of the flashlight housing is variable and can be determined by the user and the items selected to be mounted within the various sections of the flashlight housing. FIG. 1B also illustrates that the demarcations of the sections of the flashlight housing are not fixed but are only used in this description to lend clarity to the description. In particular, in FIG. 1B, it is noted that the power source extends from the handle of the flashlight housing into the sensor housing section of the flashlight housing. FIG. 1B also shows a cover at the end of the flashlight housing handle. In this variation, removal of the handle cover is required to gain access to the power source.

The integration of an image sensor, which is enclosed within a flashlight housing, with the typical illumination capability of a flashlight provides distinct advantages, especially for use in safety and security. Safety and security officers routinely carry a flashlight as part of their regular equipment. Thus, these officers, as well as others who routinely carry flashlights, benefit from the addition of a new function, image recording, without the addition of another piece of equipment to carry. Furthermore, the user can use the flashlight with the incorporated image recorder just as easily as using a flashlight alone. Thus, there is little change in an officer's routine and the added benefit of recording an unedited sequence of events, as they occurred and close to how they appeared to the user. Further benefits accrue, when a time/date stamp and GPS location stamp are simultaneously recorded as events unfold. As with other conventional recorders, a time-date stamp can be recorded on the images as the action occurs. An optional feature of the invention is the addition of a GPS device, either enclosed within or mounted on the flashlight housing to provide an accurate location stamp to recordings. Another optional feature of the invention is the incorporation of facial recognition biometric software to permit biometric data collection and recording and comparison to existing biometric data files.

Referring to FIG. 1C, which is an enlarged view of FIG. 1A without the handle, one notes that the sensor housing encloses several different sensors. As previously noted, preferably, at least one sensor is an image sensor 112. In addition to or instead of an image sensor, the user may select from a variety of physical sensors 113 and chemical sensors 114. For example, when a chemical sensor, such as an ion mobility spectrometer for alcohol detection, is enclosed within the sensor housing or mounted on the flashlight housing the sequence of recorded events could include a video recording of a persons gait, with a simultaneous audio recording of that person's speech pattern and an officer's advising that person of his/her legal rights, along with a visual recording of the method used to obtain a breath sample. On playback, one would have a time-date-location stamped audio visual recording, further stamped with a reading of the alcohol level obtained, in a neat evidentiary package. An officer would be better prepared to account for any time lapses that might occur. A given case would be adjudicated more on the facts as they occurred than on supposition. Thus, in addition to the benefit of recording an unedited sequence of events, as they occurred, there is the advantage of the simultaneous collection of alcohol detection. Furthermore, by recording all events, times, locations, and chemical tests simultaneously with one device, the evidence should be less subject to allegations of tampering than if the evidence were recorded on three separate devices, or left to the memory of witnesses.

FIG. 1C also illustrates an optional manual switch 117. The manual switch is rotated to turn a function of the apparatus on or off, to select one of a number of functions, or to vary the intensity of a function. For example, a rotation of the switch may turn the illumination or recording function of the apparatus on or off. Alternatively, a quarter turn may turn on IR light illumination, and another quarter turn may turn on visible light illumination and a third quarter turn may turn on UV light illumination. That is, the manual switch may have a number of preset positions. In the example given there are four preset positions, off, IR illumination, visible illumination and UV illumination.

Note that in some of the embodiments, the manual switch positions a filter into the path of light destined to strike an image sensor. Furthermore, in at least one embodiment, the movement of that filter simultaneously changes the mode of the image sensor.

In some LEDs the color output spectrum varies when the current applied to an LED is changed. A further alternative is that the manual switch can function as a momentary contact switch where a rotation in one direction changes the current to an array of LEDs and increases the wavelength of light output and rotation in the other direction decreases the wavelength of light output, similar to the volume switch pairs on a television remote control device.

Referring to FIG. 1D, the manual switch has been removed to reveal the LED housing 118, which holds the LED illumination source in the flashlight housing.

Referring back to FIGS. 1C and 1D, the sensor housing and LED housing contents and related components will now be discussed. In general, a sensor housing of the present invention optionally encloses at least one lens 119, at least one image sensor, at least at least one chemical sensor, and a fan 120. The lens transmits an image of an illuminated object to an image sensor, such as a charge coupled device (CCD) or CMOS. An image sensor couples the lens to imaging circuitry. Preferably, the user may select to record a still picture or a video moving picture. The imaging circuitry converts the image of the object into image signals. Preferably, the imaging circuitry then outputs the image signals to a monitor 121 and simultaneously to at least one recording device, which may be internal or external to the flashlight housing. The output of the image signals may be transmitted by hard wiring, infrared, radiofrequency transmission, or other technologies suitable for transmission of signals. Preferably, at least one recording device is enclosed within or mounted on the flashlight housing. Other recording devices can be located remotely, for example in an officer's vehicle or at a central station. Any image sensor, suitable for the particular situation can be used. Any suitable conventional circuitry can be used and is not shown in the drawings.

A variety of chemical and physical sensors can be used in the invention. Limitations of space have been overcome in many instances as the sensors become smaller. Physical sensors such as a Geiger Counter and Chemical Sensors, such as Ion Mobility Spectrometers (IMS) can be enclosed within or mounted on the flashlight housing. The user can select one or more IMS for use with the invention. Theoretically, an IMS can be developed for any substance that emits an odor. Many IMSs have been developed or are in various stages of development. Of particular interest to safety and security officers are IMSs that detect plastic explosives, various gases such as carbon monoxide and chlorine, narcotics, alcohol and various biological agents.

The medical community also has an interest in the use of IMSs for the detection of gases such as carbon monoxide, narcotics, alcohol, and the identification of various odors emitted by bacteria. Physicians and nurses often speak of a characteristic odor for Strep Throat or for Pseudomonas infections. It is conceivable, therefore, that IMSs may replace some qualitative test for the identification of malodorous infections, giving practitioners an instant result instead of waiting days for cultures to grow. In the invention, a fan is enclosed in the sensor unit to draw air through the chemical sensors. The same fan can be positioned to cool circuitry or devices that require cooling. An advantage of the invention is that a single fan can be used to simultaneously draw air through a plurality of IMSs permitting the simultaneous analysis of several types of ions and the recording of levels for those ions. The invention permits the simultaneous recording of images and ion levels which can be used to track changes in an environment or an individual over time.

Notably, instead of or in addition to a fan to draw air through a sensor, a fan or puff of air can be used to disturb the air around a subject to be tested in order to allow an IMS to detect any substance detectable by the IMS. Furthermore, a reversible fan can also be employed.

In FIG. 1D the manual switch of FIG. 1C has been removed to bring the underlying LED housing into view. Although any type of lamp can be used in the invention to provide illumination, LEDs have characteristics which make them very suitable for use in a safety and security device. Some LEDs have a particular color output spectrum. That is, a particular LED may emit light in the visible, infrared or ultraviolet spectrum, or a particular range of wavelengths. In addition to color output, LEDs are made in various sizes and shapes and with a variety of viewing angles. For any particular purpose, the user may select the LED having the characteristics best suited for that purpose. Furthermore, some LEDs and LED arrays are easily replaceable, for example by simply unplugging one unit and plugging in another. In other LEDs the color output spectrum varies when the current applied to an LED is changed. Thus, switches may be used to not only control the brightness of an LEDs output but also to vary the color output spectrum of an LED. Pairs of momentary contact switches, such as those which are found on television remote controls, are well suited for these purposes. A flashlight may be fitted with more than one set of LEDs, with each set of LEDs controlled separately. For example, one set of momentary contact switches can be used to control blue LED output, another pair for green LED output, and a third pair for red LED output. Another possibility is to use switches to change the color position over a spectrum or chromaticity diagram.

The power source supplies power to both the flashlight LEDs or lamps and the sensors of the invention, as well as to a monitor or display attached to the apparatus, and a transmitter to send signals to a remote receiver. Preferably, the lighting and sensors are engaged independently of each other. It is important to note, that flashlight functions and sensor functions of the invention may work independently of each other or together. In particular, the lighting provided by the flashlight function does not have to be synchronized to the frame rate or any other characteristic of the image sensor or imaging function of the invention.

Figure 2C:
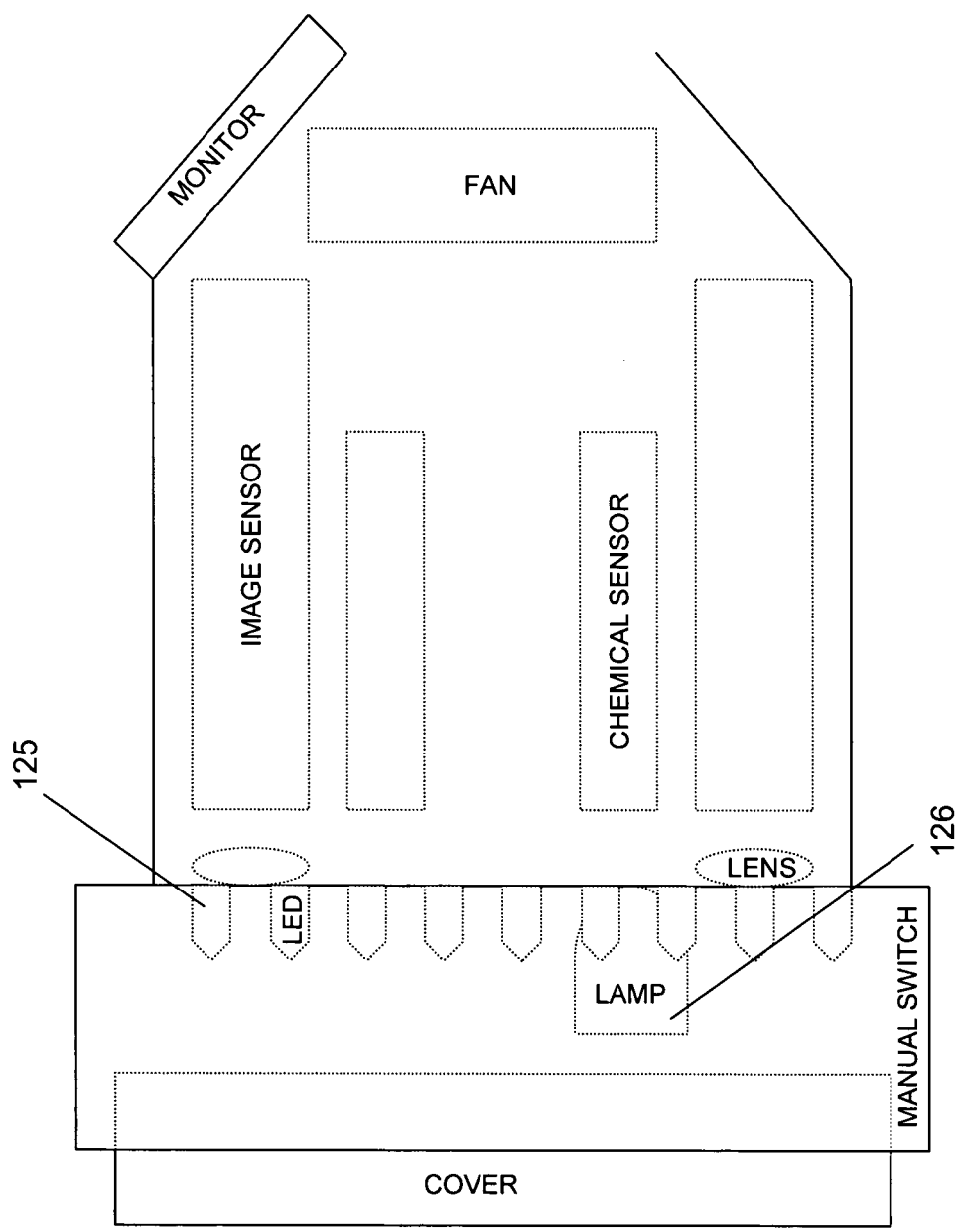
FIG. 2C is a side view schematic of the front end and sensor housing of the embodiment depicted in FIG. 2A.

FIGS. 2A and 2C illustrate that the variety and combination of sensors which can be used in the invention is determined by the users needs. For example, one can incorporate two image sensors into the device, thereby switching from one sensor best suited for one purpose or source of illumination to another sensor best suited for another purpose or source of illumination.

Further illustrated in FIGS. 2A and 2C is the addition of a translucent cover 122 to the front end of the flashlight housing or manual switch.

FIG. 2B illustrates that the manual switch 123 may be positioned off center relative to the body of the flashlight housing and that an optional handle can be incorporated into the flashlight housing. FIG. 2B also further illustrates the variability of the size and shape of the sensor housing 124.

Also illustrated in 2B is the attachment of a shoe 106 to the flashlight housing. A shoe can serve to connect the apparatus to a docking station for the purpose of recharging the batteries or downloading data.

Figure 3:
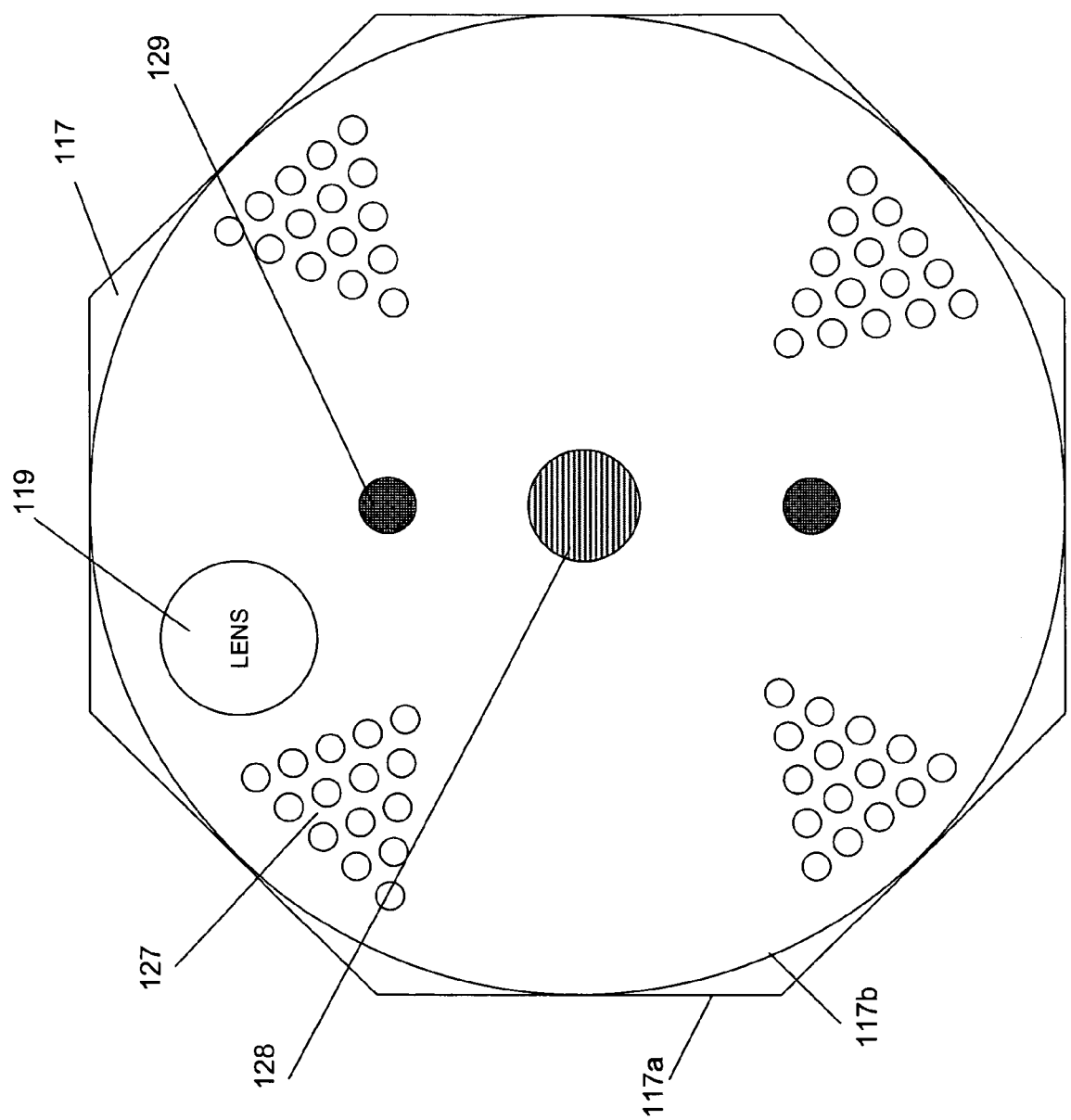
FIG. 3 illustrates a schematic of the front end the embodiment depicted in FIGS. 1A.
Figure 4:
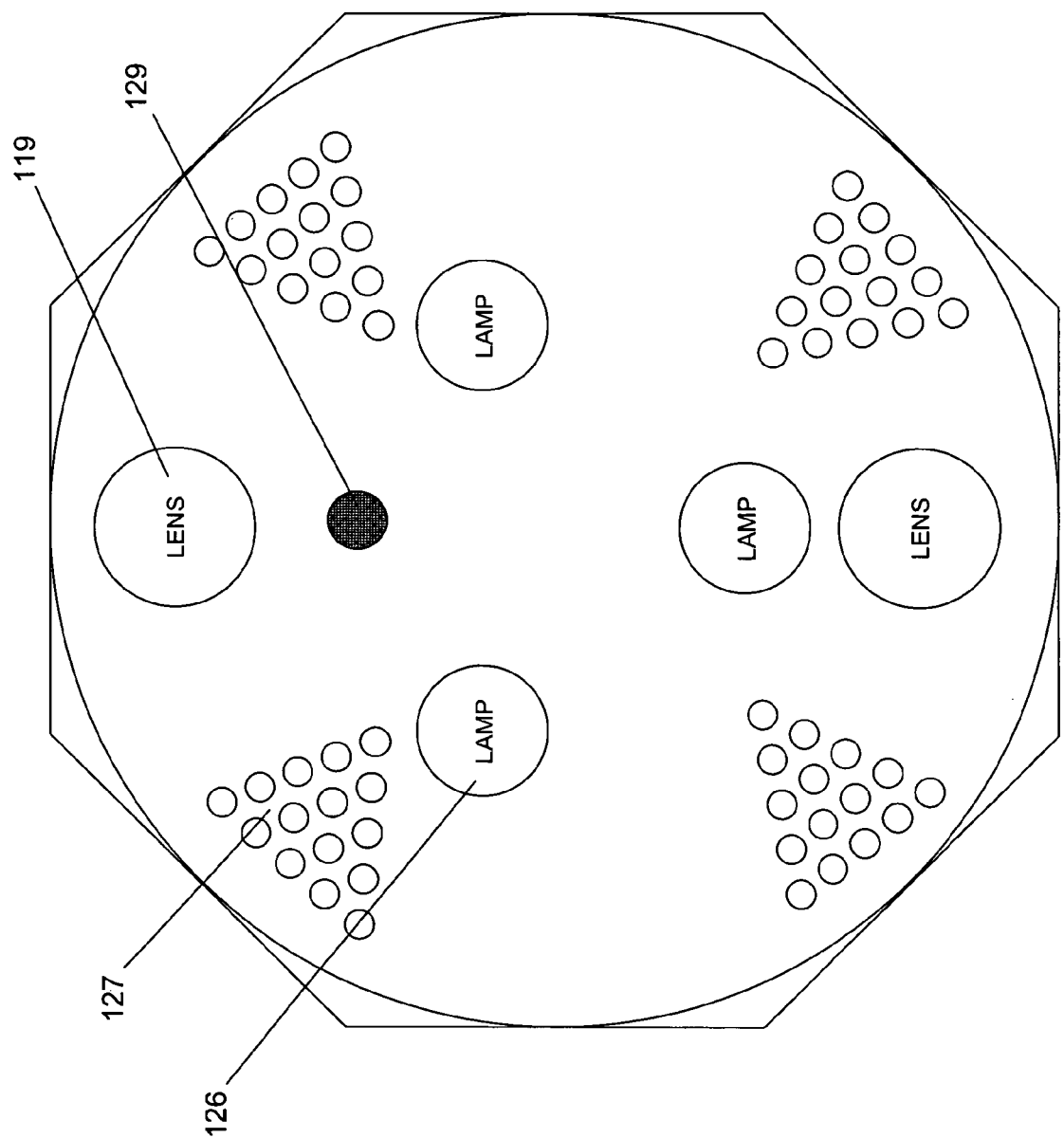
FIG. 4 illustrates a schematic of the front end of the embodiment depicted in FIG. 2A.

FIG. 2C illustrates the use of two different illumination sources. The first illumination source includes LEDs 125, for example Infrared LEDs. The second illumination source includes one or more lamps 126, for example visible light emitting lamps, which preferably are also LEDs FIGS. 3 and 4 provide front end views of the embodiments depicted in FIGS. 1A and 2A respectively. FIGS. 3 and 4 illustrate a front end view of an optional manual switch, and different configurations of LEDs, Lamps and Lenses and Fenestrations (or Openings) that vary depending on the sensors and sources of illumination selected for use in a particular embodiment of the invention.

The manual switch 117 is represented by the octagon in FIGS. 3 and 4. The outer edge 117a of the manual switch is octagon in shape, while the inner edge is circular 117b. The actual cross section of the outer edge of the switch can be any shape, but a circular or regular polygon cross section would be preferred. The rotation of the manual switch can be used to turn illumination on and off, or to select from two or more sources of illumination, or to vary the intensity of illumination or the color spectrum of illumination. And, as noted previously, the manual switch can also be used to position a filter into the path of light destined to strike an image sensor. And, furthermore, in at least one embodiment, the movement of that filter simultaneously changes the mode of the image sensor.

Referring to FIG. 3, the device has a lens 119 which is mounted in front of an image sensor 112. The four triangular arrays 127 of small circles represent arrays of LEDs. The central horizontally lined circle 128 represents the positioning of a physical sensor such as a Geiger counter. And, the diagonally cross-hatched circles 129 (the smallest of the filled circles) represent fenestrations in front of chemical sensors, such as ion mobility spectrometers.

Referring to FIG. 4, there are two lenses 119 which are mounted in front of image sensors, the four triangular arrays 127 of small circles represent arrays of LEDs. And, as in FIG. 3, the diagonally cross-hatched circle 129 (the smallest of the filled circles) represents fenestrations in front of a chemical sensor(s). Also, in FIG. 4, are three circles representing Lamps 126. The Lamp also is illustrated in FIGS. 2A and C. The Lamp represents a different LED or array of LEDs relative to the triangular array illustrated. It is also noted that lamps other than LEDs can be used in the invention.

Figure 5:
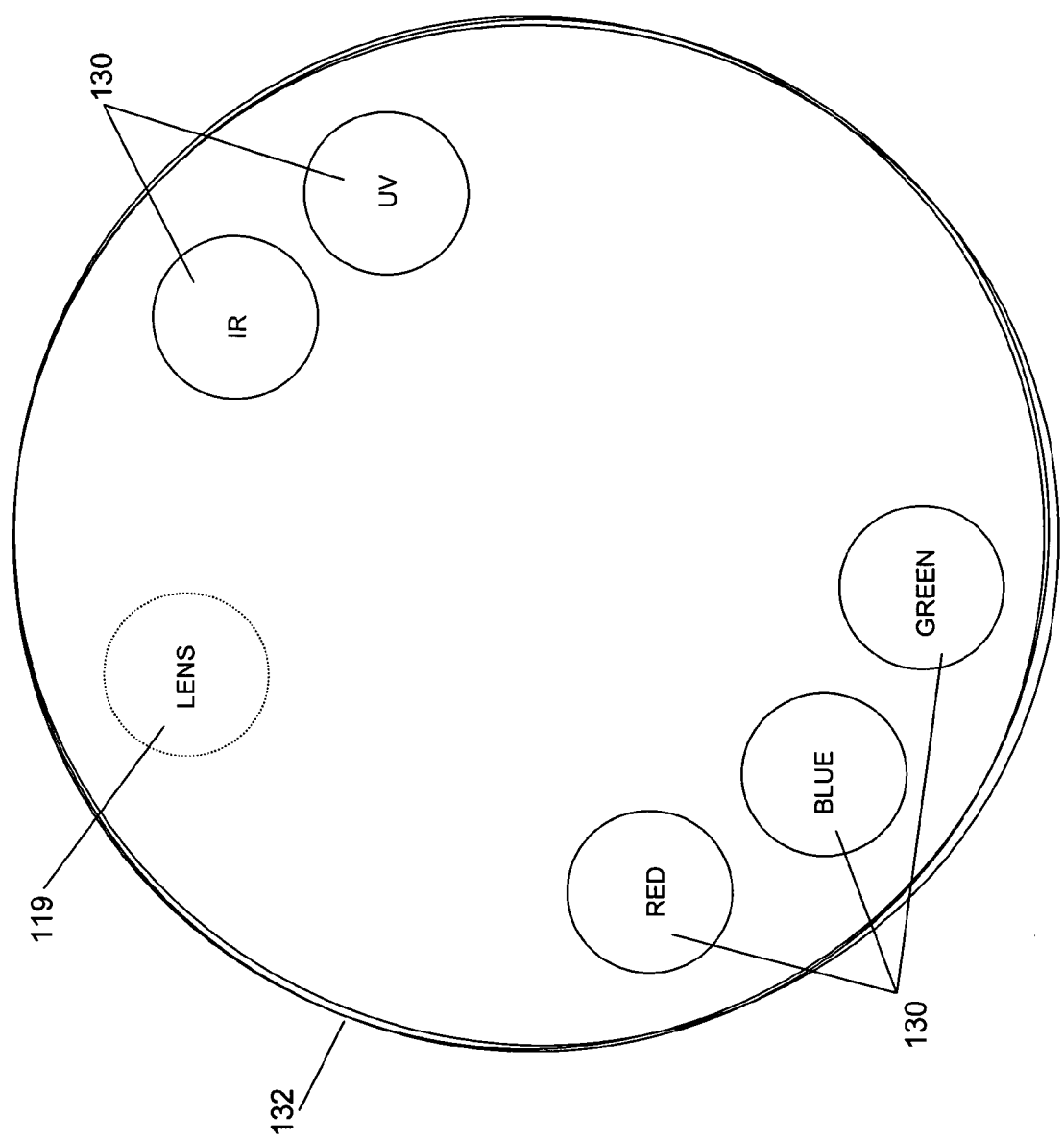
FIGS. 5, 6, 6A, 6B and 7 illustrate schematics of filter covers for use in the embodiments of the invention.
Figure 6:
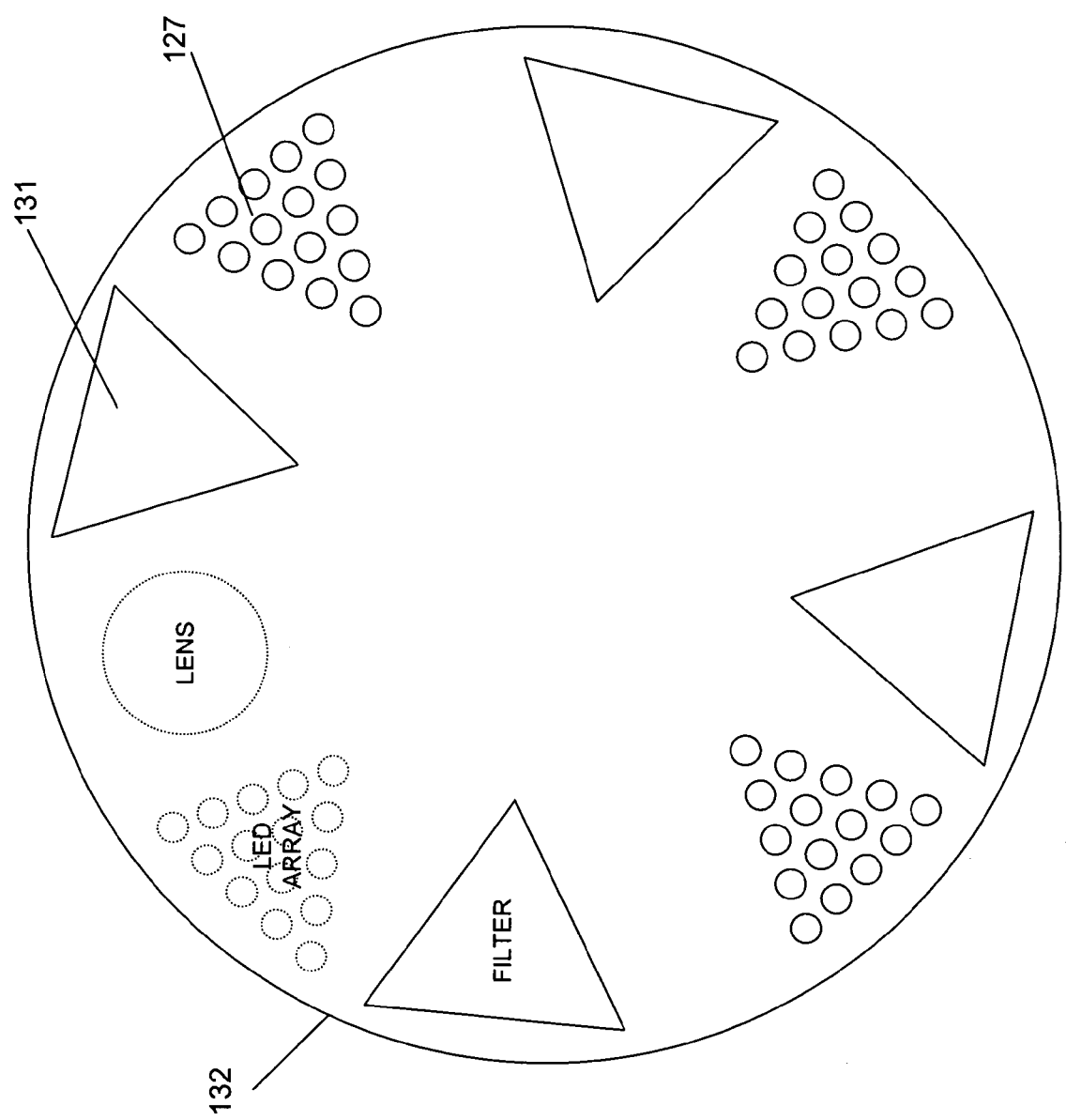
Figure 7:
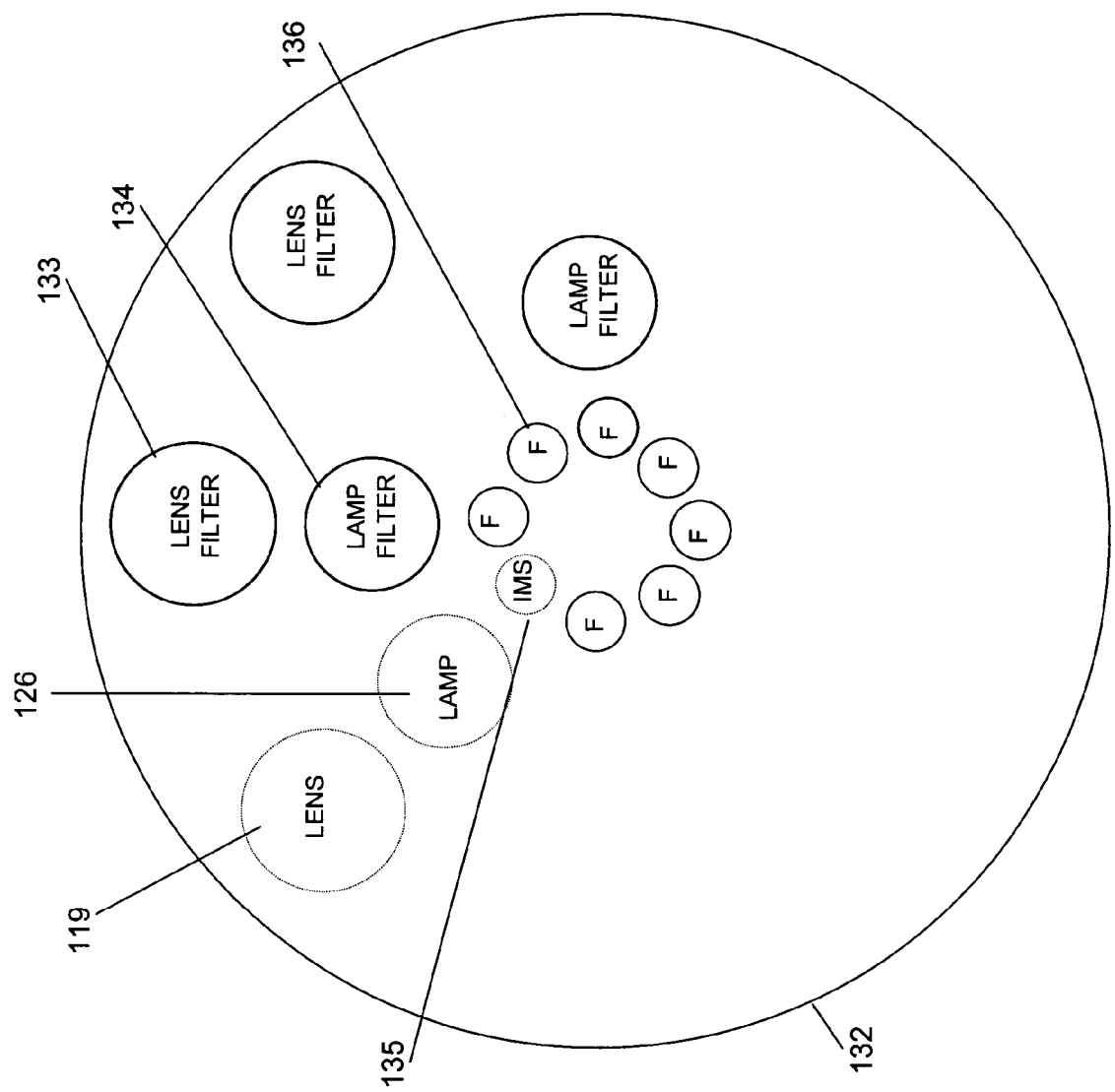

FIGS. 5, 6, and 7 are schematics of examples of translucent covers that can be used in the invention. In FIG. 5, the translucent cover 132 is a carrier for filters which can be positioned over a lens of the invention. The cover is translucent to allow the passage of ambient light when a filter is not in use. Rotation of the translucent cover allows positioning of one of five filters 130, IR, UV, Red, Blue, or Green over the lens.

In FIG. 6, the translucent cover 132 is a carrier for four triangular filters 131. Any of the four filters can be positioned over the lens or one particular triangular LED array. The four filters can be identical. Alternatively, up to four different filters can be inserted into the carrier. Therefore, many different lighting possibilities can be achieved. For example, when used in conjunction with a five position illumination switch, where one position is off and each of the other four positions turns one only one of the four triangular light arrays, and each triangular light array emits a different wavelength of light, each triangular light array can be turned on either without filtering or with one of four filters in front of it, allowing twenty different lighting possibilities. The number of possibilities increases dramatically when a momentary contact switch is used to vary the color output spectrum of each LED array.

Figure 6A:
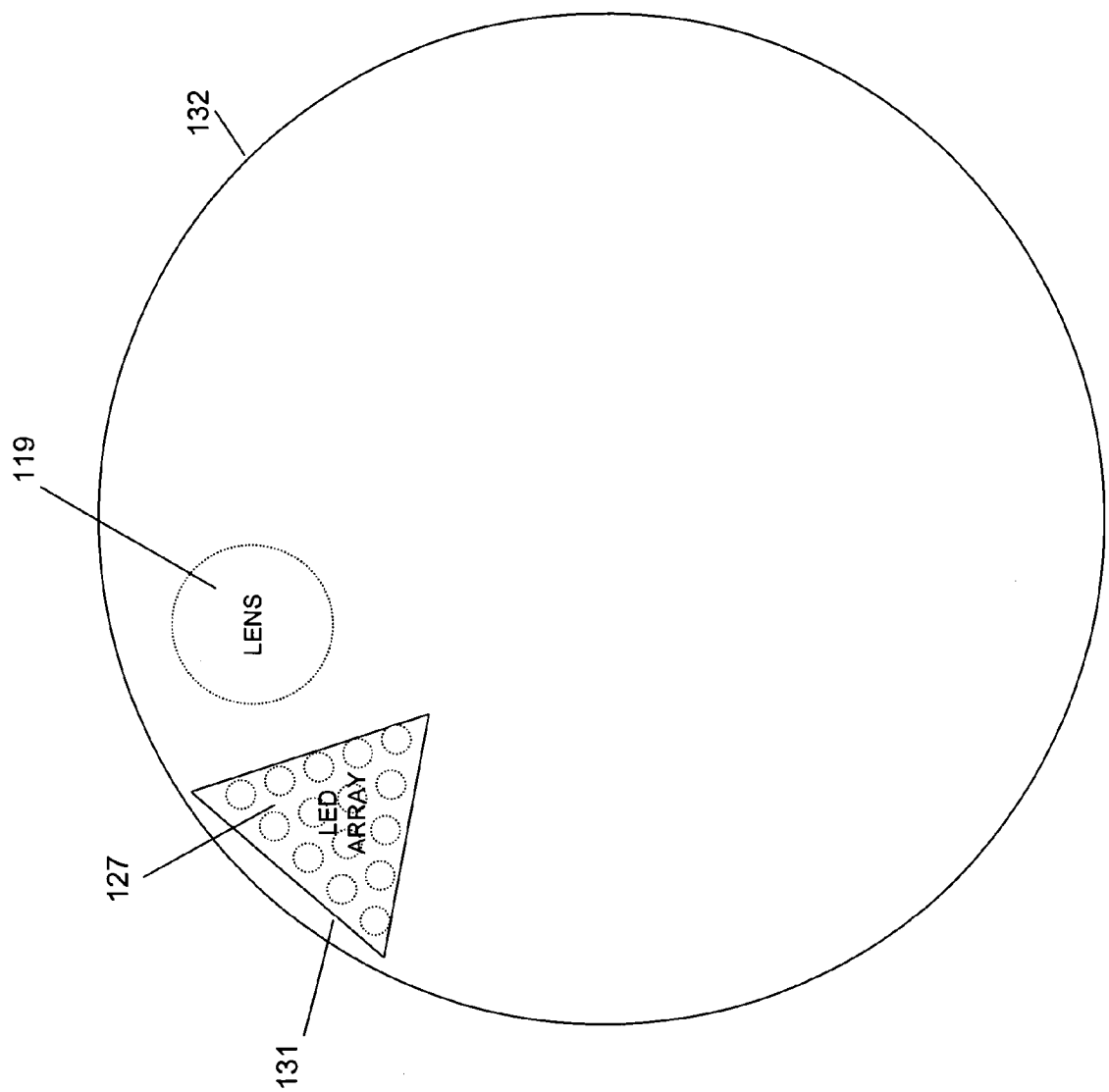
Figure 6B:
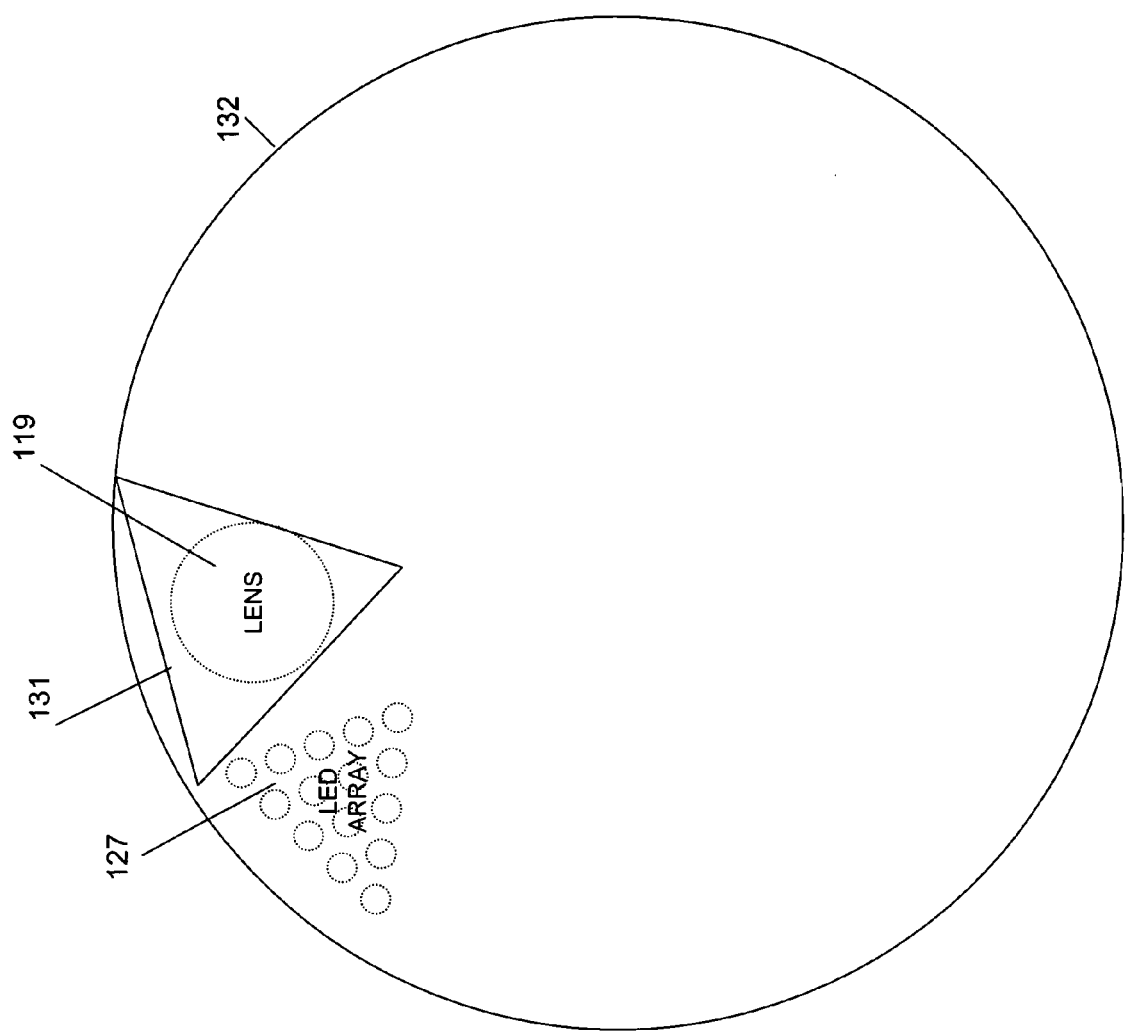

FIGS. 6A and 6B illustrate the use of a manual switch to position a filter into the path of light destined to strike an image sensor. And, furthermore, in at least one embodiment, the movement of that filter simultaneously changes the mode of the image sensor. In FIG. 6A the filter is positioned in front of LED array 127. In FIG. 6B, after the rotation of the filter with the manual switch, the filter is positioned in front of the lens.

Note, although not illustrated, the same effect of filtering light destined to strike an image sensor can be achieved by placing a filter between the lens and the image sensor in stead of in front of the lens.

FIG. 7 illustrates that the translucent carrier 132 can carry both lens filters 133 and lamp filters 134. As in the previous examples, the carrier is translucent to allow the passage of ambient light when filter is not positioned in front of a lens or lamp. In this example, the carrier can be rotated to position filters in front of both the lens and the lamp, or to position a filter only in front of the lens, or to position a filter only in front of the lamp. Also illustrated in FIG. 7 is the use of an Ion Mobility Spectrometer 135 (IMS) with a translucent cover. When a cover is placed over the opening or fenestration in front of an Ion Mobility Spectrometer, the cover must have fenestrations 136 (F) to allow the passage of air to the IMS.

Figure 8:
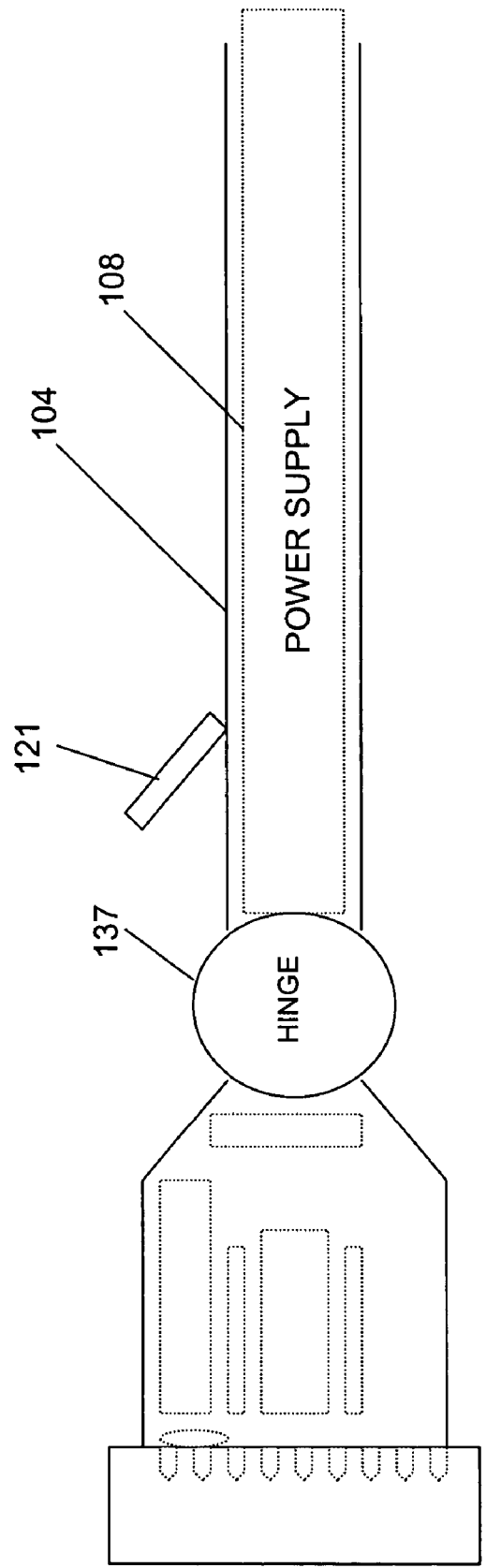
FIGS. 8 and 9 illustrates schematics of a flexible embodiment of the invention.

FIGS. 8 and 9 illustrate the use of a hinge 137 in the body of the flashlight housing. Preferably, the hinge is similar to a ball joint, which will permit the handle portion of the body to fold to near 90 degrees relative to the head of the flashlight housing, and the head of the housing to rotate 360 degrees relative to the body of the housing.

Note that the monitor has been moved from the head (as in FIGS. 1A-D, 2A and 2C) to the body of the flashlight housing. This allows a user to look around a corner without getting in harms way. A mercury switch can also be incorporated in the apparatus to keep the image upright, whether or not the housing is hinged.

FIG. 10 is an artist's rendition of a preferred embodiment of the invention. FIG. 10 illustrates a flashlight housing with an illumination source attached to or incorporated into the head 138 of the housing. A ring in the head of the housing is a manual switch. Note, a rotatable ring switch can be positioned anywhere along the head. At the neck 139 of the housing is a control panel 140 with six switches, a single switch 141, and a monitor 142. The switches control the various functions of the apparatus. The exact functions depend of the selection of features by the user. For example, the manual switch (or, ring switch) can be used to control the illumination of the apparatus, the single neck switch can be used to turn the image sensor on and off, and the panel switches can be used to set the time, date and GPS position of the apparatus when first placed in use and/or to vary the brightness of current to the illumination source.

Figure 11:
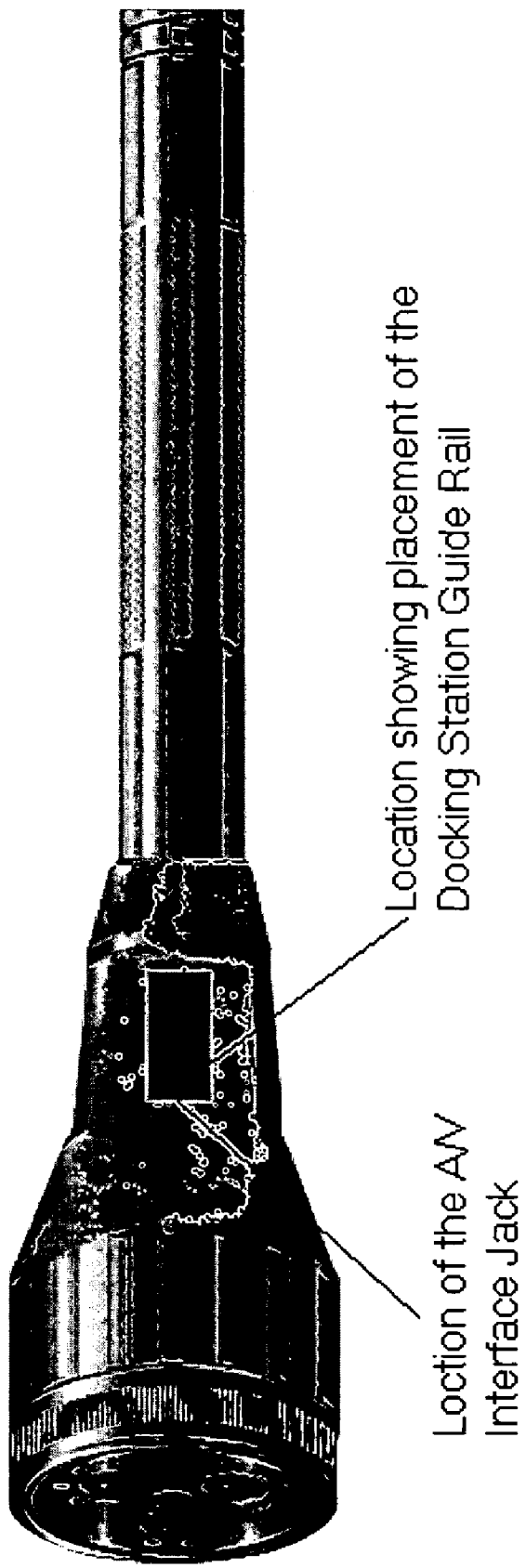
FIG. 11 illustrates a graphic illustration of another side of the flashlight housing of an embodiment of the invention.

FIG. 11 is an artist's rendition of the bottom or reverse side of the apparatus to illustrate the position of the shoe of the embodiment of FIG. 10.

Figure 12:
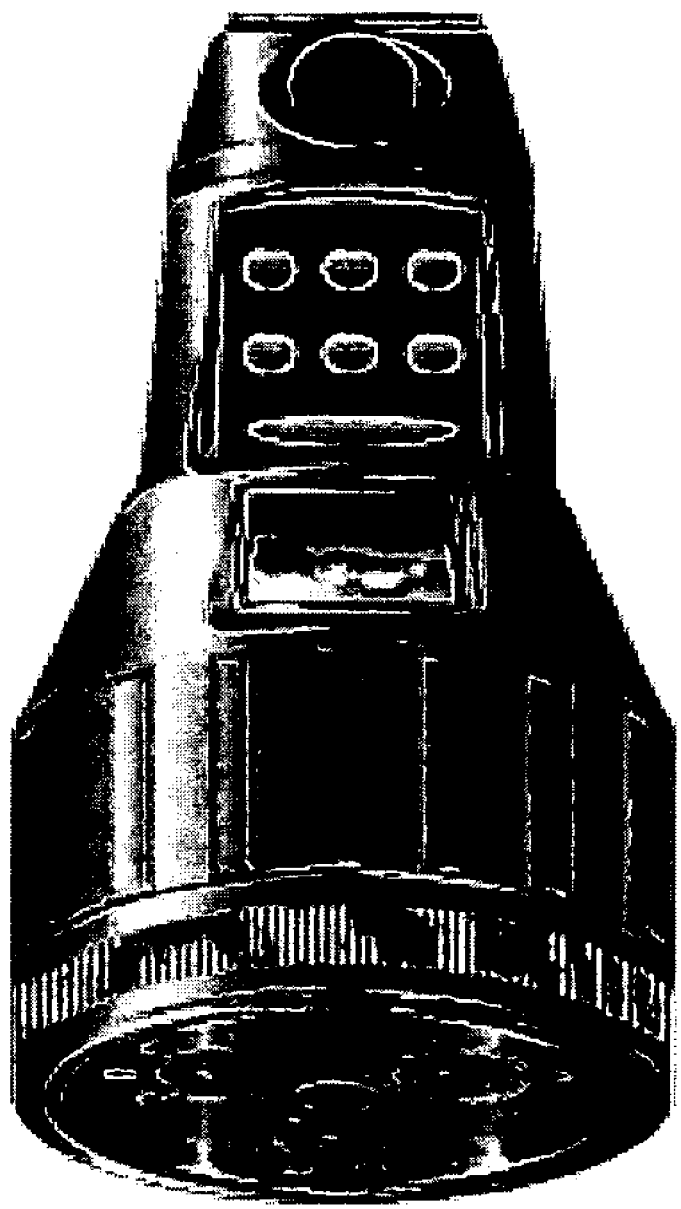
FIG. 12 illustrates a graphic illustration of a close up view of the head and neck of the embodiment in FIG. 10.

FIG. 12 is an artist's rendition of a close up view of the head and neck of the embodiment in FIG. 10.

Figure 13:
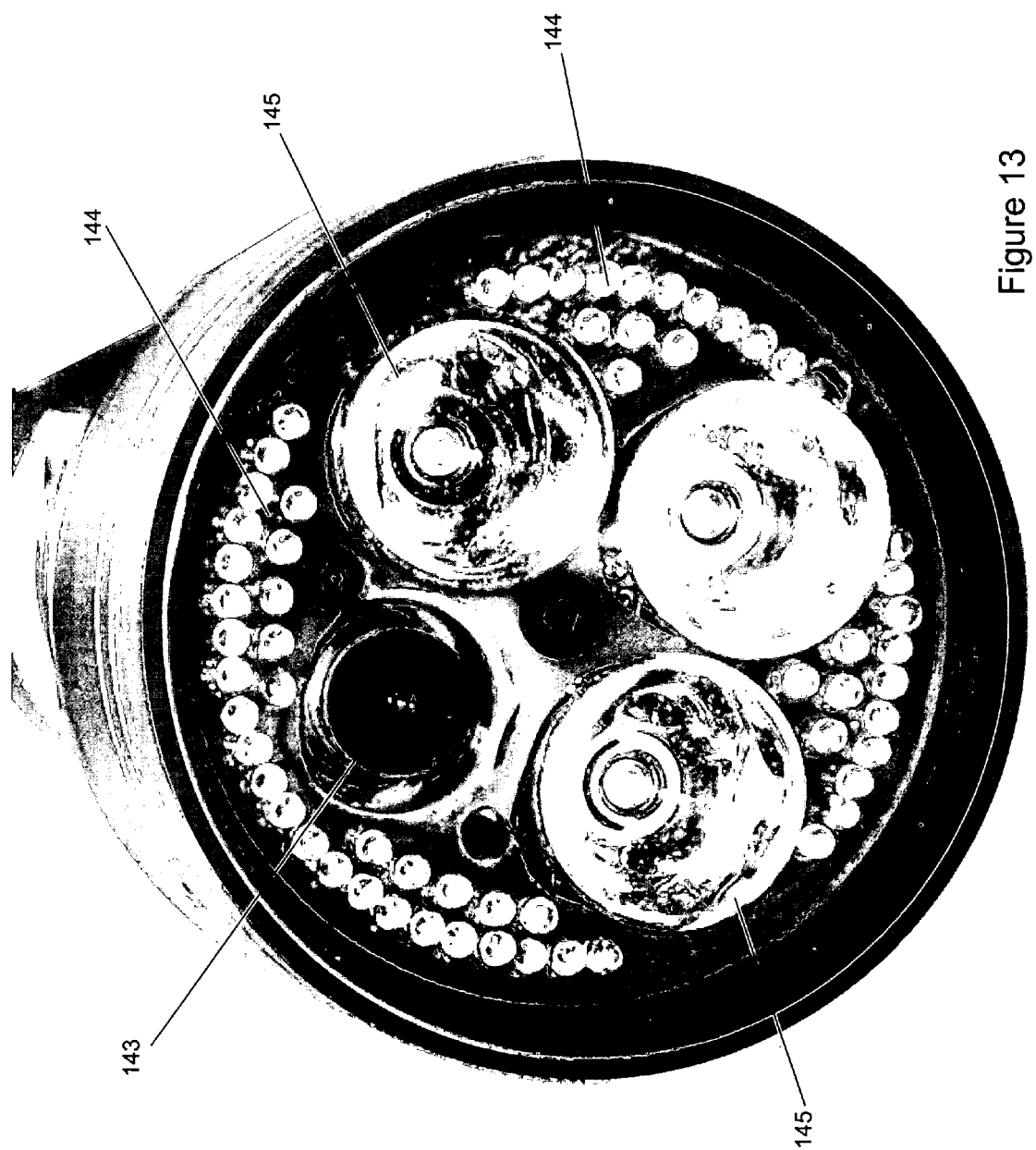
FIG. 13 is an en face view of the head of the embodiment of FIG. 10.

FIG. 13 is an en face view of the head of the embodiment of FIG. 10, showing the lens 143 at 11 o'clock, LED arrays 144 at the periphery and three Lamp LEDs 145 at 2 o'clock, 5 o'clock and 8 o'clock. In this embodiment, the manual switch can be used to switch from OFF, to LED arrays ON (for infrared lighting), to Lamp LEDs ON for visible Lighting.

Figure 14:
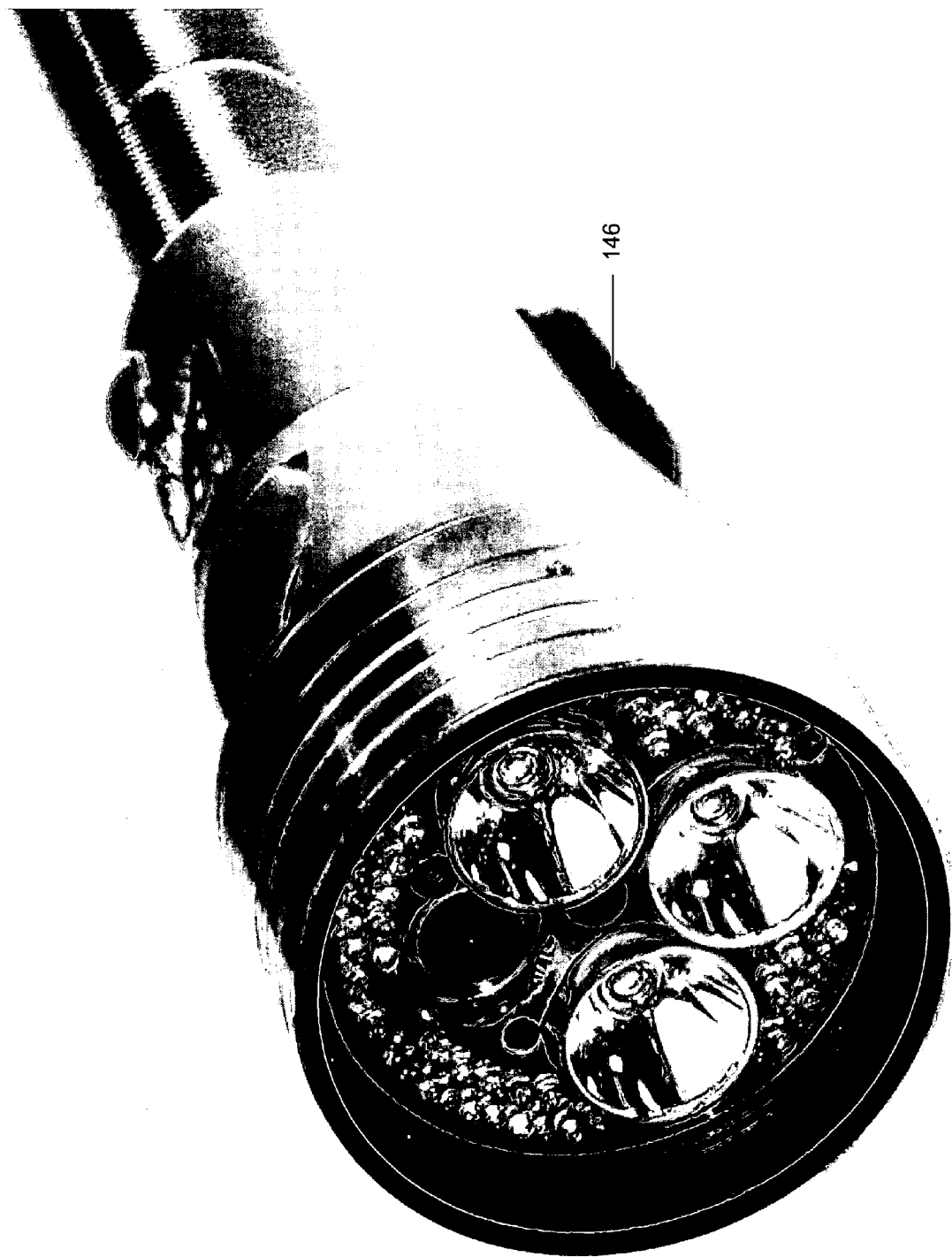
FIG. 14 is an angled view of the head and neck of the embodiment in FIG. 10.

FIG. 14 is an angled view of the head and neck of the embodiment in FIG. 10 showing the shoe on the bottom, the control panel and single switch and monitor position on the neck, and the rotatable manual ring switch and lighting and lens configuration of the head of the apparatus. Also illustrated in FIG. 14 is a docking shoe 146.

Figure 15:
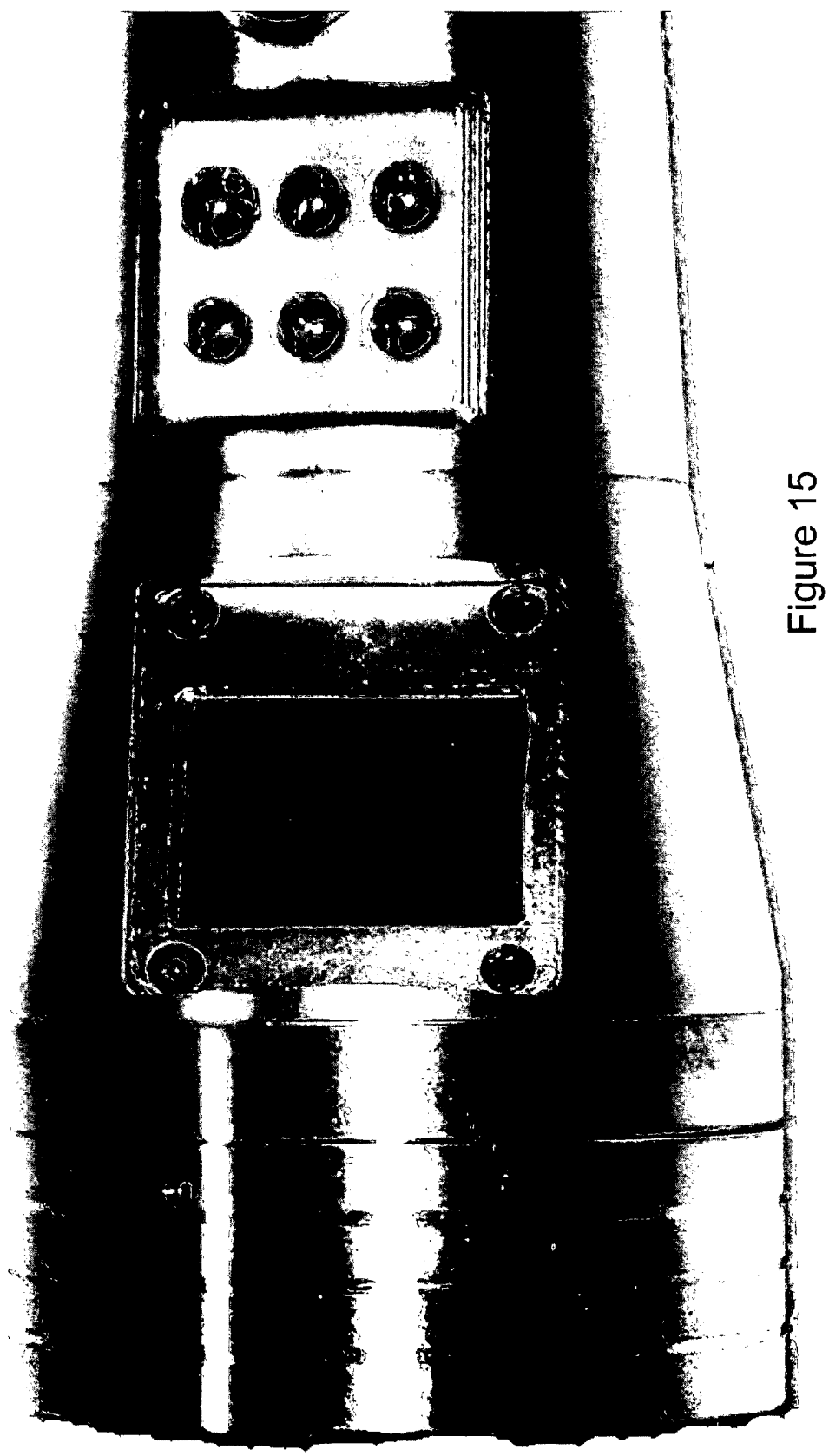
FIG. 15 is a close up view of the monitor and control panel of the embodiment illustrated in FIG. 10.

FIG. 15 is a close up view of the monitor and control panel of the embodiment illustrated in FIG. 10.

Referring back to FIG. 1E, the embodiment illustrated is a penlight shaped device which includes a light source 147, an image sensor 148 and a second sensor 149, which is either a physical sensor or a chemical sensor. Preferably, the image sensor can take still or video pictures.

Examples of the use of this form of the device of the present invention include a health care worker taking a photograph of an inflamed throat and simultaneously sampling the odors emitted by suspected pathogens with a chemical sensor and an inspector of a natural gas line photographing the reflection of a selected wavelength of light from a leaking gas line while sampling the gas with a chemical sensor.

As is understood by a person skilled in the art, the preferred embodiment of the present invention is illustrative of the present invention rather than being limiting of the present invention. Revisions and modifications may be made to methods, processes, materials, structures, shapes and dimensions through which is formed a device formed in accord with the present invention as defined by the appended claims.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

What is claimed is:

1. A device comprising:
   a first illumination source of visible light illumination in the range of from 0 to 85,000 candlepower,
   a second illumination source of infrared light illumination in the range of from 850 to 900 nanometers,
   a lens,
   an image sensor, configured to include a first mode suitable for producing color images from visible light and a second mode suitable for producing black and white images from infrared light,
   a switch configured to enable selection of the first or second mode of said image sensor,
   an infrared pass filter permitting the passage of light in the range of from 850 to 900 nanometers
   a housing which resembles a flashlight housing, including a front face, a head and an elongated griping portion,
   a docking shoe, positioned on the bottom of said head portion, operable to dock the device to a battery charging station,
   a data port, positioned proximal to the docking station, a monitor mounted on said head portion and operable to display images from signals produced by said image sensor;

wherein said illumination sources are positioned on the front face of the device;

wherein said lens is positioned on the front face of the device and said image sensor is positioned to permit light passing through said lens to project onto said image sensor;

wherein the selection of said second mode positions said filter such that only light passing through said filter projects onto said image sensor.

* * * * *